(12) United States Patent
Kato et al.

(10) Patent No.: US 6,415,089 B2
(45) Date of Patent: *Jul. 2, 2002

(54) OPTICAL FIBER AND OPTICAL TRANSMISSION SYSTEM INCLUDING THE SAME

(75) Inventors: Takatoshi Kato; Eisuke Sasaoka; Shigeru Tanaka, all of Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/919,904

(22) Filed: Aug. 2, 2001

Related U.S. Application Data

(63) Continuation of application No. 09/847,438, filed on May 3, 2001, which is a continuation of application No. 09/580,483, filed on May 30, 2000, now Pat. No. 6,266,467, which is a continuation-in-part of application No. PCT/JP99/06611, filed on Nov. 26, 1999.

(30) Foreign Application Priority Data

| Nov. 26, 1998 | (JP) | ............................................. 10-335797 |
| Mar. 31, 1999 | (JP) | ............................................. 11-093511 |
| Oct. 22, 1999 | (JP) | ................................. PCT/JP99/05855 |

(51) Int. Cl.⁷ ................................................. G02B 6/16
(52) U.S. Cl. ........................ 385/123; 385/124; 385/125; 385/126; 385/127; 385/128
(58) Field of Search ................................. 385/123, 124, 385/125, 126, 127, 128

(56) References Cited

U.S. PATENT DOCUMENTS

| 4,755,022 A | 7/1988 | Ohashi et al. ............ 350/96.33 |
| 5,553,185 A | 9/1996 | Antos et al. ................. 385/127 |
| 5,555,340 A | 9/1996 | Onishi et al. ............... 385/127 |
| 5,675,690 A | 10/1997 | Nouchi et al. .............. 385/127 |
| 5,684,909 A | 11/1997 | Liu ............................. 385/127 |
| 5,721,800 A | 2/1998 | Kato et al. |
| 5,732,178 A | 3/1998 | Terasawa et al. ........... 385/127 |
| 5,748,824 A | 5/1998 | Smith ......................... 385/124 |

(List continued on next page.)

FOREIGN PATENT DOCUMENTS

| EP | 0 604 787 A1 | 7/1994 |
| EP | 0 656 326 A2 | 6/1995 |
| EP | 0 851 245 A2 | 7/1998 |
| EP | 0 862 069 A2 | 9/1998 |
| EP | 0 887 670 A2 | 12/1998 |
| JP | 10-53429 | 2/1998 |

OTHER PUBLICATIONS

V.A. Bhagavatula, A.J. Antos, Technology Division, Sullivan Park, Corning, Inc., Corning, New York, "Dispersion–shifted single–mode fiber for high–bit–rate and multiwavelength systems", OFC '95 Technical Digest, pp. 259–260.
O plus E, vol. 19, No. 216, Nov. 1997, pp. 143–148.

*Primary Examiner*—Akm E. Ullah
*Assistant Examiner*—Jennifer Doan
(74) *Attorney, Agent, or Firm*—McDermott, Will & Emery

(57) ABSTRACT

The present invention relates to an optical fiber which enables favorable optical communications in 1.3-$\mu$m and 1.55-$\mu$m wavelength bands, and an optical transmission system including the same. The optical fiber according to the present invention has only one zero-dispersion wavelength within a wavelength range of 1.20 $\mu$m to 1.60 $\mu$m, the zero-dispersion wavelength existing within a wavelength range of 1.37 $\mu$m to 1.50 $\mu$m, and has a positive dispersion slope at the zero-dispersion wavelength, thereby enabling favorable optical communications utilizing each signal light in the 1.3-$\mu$m and 1.55-$\mu$m wavelength bands sandwiching the zero-dispersion wavelength.

8 Claims, 12 Drawing Sheets

U.S. PATENT DOCUMENTS

| | | | |
|---|---|---|---|
| 5,822,488 A | 10/1998 | Teresawa et al. | 385/127 |
| 5,835,655 A | 11/1998 | Liu et al. | 385/124 |
| 5,838,867 A | 11/1998 | Onishi et al. | 385/123 |
| 5,852,701 A | 12/1998 | Kato et al. | 385/127 |
| 5,963,700 A | 10/1999 | Kato et al. | 385/127 |
| 5,995,694 A | 11/1999 | Akasaka et al. | 385/123 |
| 5,999,679 A | 12/1999 | Antos et al. | 385/127 |
| 6,009,221 A | 12/1999 | Tsuda | 385/123 |
| 6,009,222 A | 12/1999 | Dong et al. | |
| 6,031,955 A | 2/2000 | Mukasa et al. | 385/123 |
| 6,072,929 A | 6/2000 | Kato et al. | |
| 6,266,467 B1 * | 7/2001 | Kato et al. | 385/123 |

* cited by examiner

FIG.11

| | 1st Embodiment | 2nd Embodiment | 3rd Embodiment | 4th Embodiment | 5th Embodiment | 6th Embodiment | 7th Embodiment | 8th Embodiment | 9th Embodiment | 10th Embodiment | 11th Embodiment | 12th Embodiment | 13th Embodiment |
|---|---|---|---|---|---|---|---|---|---|---|---|---|---|
| Zero-dispersion wavelength ($\mu m$) | 1.44 | 1.46 | 1.42 | 1.41 | 1.48 | 1.42 | 1.41 | 1.42 | 1.42 | 1.44 | 1.42 | 1.41 | 1.41 |
| Dispersion slope (ps/nm²/km) at zero-dispersion wavelength | 0.060 | 0.053 | 0.079 | 0.081 | 0.064 | 0.056 | 0.075 | 0.084 | 0.077 | 0.070 | 0.080 | 0.088 | 0.057 |
| Dispersion slope (ps/nm²/km) at wavelength 1.55 $\mu m$ | 0.054 | 0.049 | 0.070 | 0.070 | 0.064 | 0.052 | 0.061 | 0.068 | 0.061 | 0.058 | 0.065 | 0.071 | 0.048 |
| Cutoff wavelength ($\mu m$) | 0.96 | 0.93 | 1.19 | 1.15 | 1.24 | 1.23 | 1.10 | 1.17 | 1.22 | 1.18 | 1.16 | 1.22 | 1.04 |
| Dispersion (ps/nm/km) at wavelength 1.20 $\mu m$ | −18.5 | −18.5 | −20.8 | −20.3 | −20.3 | −16.4 | −20.1 | −22.9 | −21.6 | −21.5 | −21.8 | −22.5 | −15.7 |
| wavelength 1.30 $\mu m$ | −9.6 | −10.1 | −10.6 | −9.9 | −11.9 | −7.9 | −9.3 | −11.1 | −10.2 | −10.8 | −10.5 | −10.6 | −7.2 |
| wavelength 1.45 $\mu m$ | 0.6 | −0.5 | 2.1 | 3.1 | −1.9 | 1.6 | 3.0 | 2.4 | 2.2 | 0.7 | 2.3 | 3.4 | 2.2 |
| wavelength 1.55 $\mu m$ | 6.2 | 4.3 | 9.3 | 10.2 | 4.8 | 6.6 | 9.4 | 9.9 | 9.1 | 7.3 | 9.5 | 11.0 | 7.1 |
| wavelength 1.60 $\mu m$ | 8.8 | 6.7 | 12.8 | 13.7 | 8.0 | 9.2 | 12.4 | 13.2 | 12.1 | 10.1 | 12.7 | 14.5 | 9.4 |
| Bending loss (dB/turn) at wavelength 1.55 $\mu m$ at diameter 32mm | 0.06 | 0.20 | 0.006 | 0.004 | 0.0008 | 0.02 | 0.3 | 0.2 | 0.2 | 0.03 | 0.005 | 0.4 | 0.04 |
| Effective area ($\mu m^2$) at wavelength 1.55 $\mu m$ | 49.1 | 47.2 | 63.6 | 62.0 | 53.9 | 57.1 | 67.3 | 79.1 | 73.5 | 59.6 | 62.6 | 92.7 | 52.2 |

FIG. 12

| | 14th Embodiment | 15th Embodiment | 16th Embodiment | 17th Embodiment | 18th Embodiment | 19th Embodiment | 20th Embodiment | 21st Embodiment | 22nd Embodiment |
|---|---|---|---|---|---|---|---|---|---|
| Zero-dispersion wavelength ($\mu$m) | 1.41 | 1.46 (1.457) | 1.47 | 1.40 | 1.41 | 1.38 | 1.40 | 1.40 | 1.39 |
| Dispersion slope (ps/nm²/km) at zero-dispersion wavelength | 0.065 | 0.060 | 0.065 | 0.071 | 0.058 | 0.065 | 0.059 | 0.057 | 0.052 |
| Dispersion slope (ps/nm²/km) at wavelength 1.55 $\mu$m | 0.055 | 0.060 | 0.065 | 0.059 | 0.040 | 0.047 | 0.043 | 0.046 | 0.023 |
| Cutoff wavelength ($\mu$m) | 1.25 | 1.07 | 1.37 | 1.78 | 1.75 | 1.52 | 1.59 | 1.44 | 1.66 |
| Dispersion (ps/nm/km) at wavelength 1.20 $\mu$m | −16.8 | −20.2 | −21.1 | −17.4 | −16.5 | −14.5 | −15.8 | −15.2 | −14.4 |
| wavelength 1.30 $\mu$m | −7.7 | −11.1 | −12.1 | −7.7 | −7.5 | −5.4 | −6.9 | −6.5 | −5.7 |
| wavelength 1.45 $\mu$m | 2.5 | −0.6 | −1.3 | 3.5 | 2.1 | 4.4 | 2.7 | 2.7 | 2.8 |
| wavelength 1.55 $\mu$m | 8.5 | 5.7 | 5.1 | 9.7 | 6.8 | 9.4 | 7.4 | 7.5 | 5.9 |
| wavelength 1.60 $\mu$m | 11.2 | 8.7 | 8.4 | 12.6 | 8.6 | 11.7 | 9.5 | 9.8 | 7.0 |
| Bending loss (dB/turn) at wavelength 1.55 $\mu$m at diameter 32mm | 0.00002 | 0.00006 | 0.02 | 0.00002 | 0.2 | 0.07 | 0.001 | 0.1 | 0.3 |
| Effective area ($\mu$m²) at wavelength 1.55 $\mu$m | 50.1 | 45.3 | 62.6 | 60.3 | 57.1 | 64.5 | 50.4 | 64.4 | 55.6 |

OPTICAL FIBER AND OPTICAL TRANSMISSION SYSTEM INCLUDING THE SAME

RELATED APPLICATIONS

This is a Continuation application of U.S. application Ser. No. 09/847,438, filed on May 3, 2001, which is a Continuation application of U.S. application Ser. No. 09/580,483, filed on May 30, 2000, now U.S. Pat. No. 6,266,467, which in turn is a Continuation-In-Part application of International Patent Application Serial No. PCT/JP99/06611, filed on Nov. 26, 1999.

BACKGROUND OF THE INVENTION

1. Field of the Invention

The present invention relates to an optical fiber applicable to a transmission line in optical communications, and an optical transmission system including this optical fiber.

2. Related Background Art

Conventionally, as a transmission line in optical communications, standard single-mode optical fibers having a zero-dispersion wavelength in a 1.3-$\mu$m wavelength band (1280 nm to 1320 nm) have mainly been utilized. The transmission loss resulting from the main material (silica) of such an optical fiber has been known to become the lowest in a 1.55-$\mu$m wavelength band (1530 nm to 1565 nm). In addition, optical fiber amplifiers using an Er-doped optical fiber can amplify light in the 1.55-$\mu$m wavelength band at a high efficiency. For such a reason, dispersion-shifted optical fibers designed so as to have a zero-dispersion wavelength in the 1.55-$\mu$m wavelength band are applied to transmission lines in wavelength division multiplexing (WDM) communications for transmitting a plurality of wavelengths of signal light. As for a light source for sending out signal light, device technologies for enabling light in the 1.3-$\mu$m wavelength band and light in the 1.55-$\mu$m wavelength band to be outputted have conventionally been established.

SUMMARY OF THE INVENTION

The inventors have studied the prior art mentioned above and, as a result, found problems as follows. Namely, in the case where light in the 1.3-$\mu$m wavelength band is transmitted while a dispersion-shifted optical fiber having a zero-dispersion wavelength in the 1.55-$\mu$m wavelength band is used as an optical transmission line, the absolute value of dispersion becomes so large that WDM communications cannot be carried out in a wide band. Also, when signal light in the 1.55-$\mu$m wavelength band is transmitted through such a dispersion-shifted optical fiber, the absolute value of dispersion becomes so small that four-wave mixing, which is one of nonlinear optical phenomena, is likely to occur. In the case where light in the 1.3-$\mu$m wavelength band is transmitted while a standard single-mode optical fiber having a zero-dispersion wavelength in the 1.3-$\mu$m wavelength band is used as an optical transmission line, on the other hand, the absolute value of dispersion becomes so small that four-wave mixing, which is one of nonlinear optical phenomena, is likely to occur. Also, when signal light in the 1.55-$\mu$m wavelength band is transmitted through such a single-mode optical fiber, the absolute value of dispersion becomes so large that WDM communications cannot be carried out in a wide band.

For this matter, attempts have been made to develop optical fibers for suppressing the occurrence of dispersion over a wide wavelength band (see, for example, K. Okamoto et al., "Zero total in single-mode optical fibers over an extended spectral range," Radio Science, Volume 17, Number 1, pages 31–36, January-February 1982). For example, an optical fiber having a low dispersion value over a wide wavelength band has been proposed by yielding a large relative refractive index difference of 2.4% between its cladding region and core region and a small diameter of 3.5 $\mu$m in the core region. However, it is difficult to make such an optical fiber having a very large relative refractive index difference between the cladding region and core region, and its transmission loss is large. In an optical fiber whose core region has a smaller diameter, on the other hand, the effective area becomes smaller, and nonlinear optical phenomena are likely to occur.

In order to overcome problems such as those mentioned above, it is an object of the present invention to provide an optical fiber which enables efficient transmission of both of signal light in the 1.3-$\mu$mwavelength band and signal light in the 1.55-$\mu$m wavelength band, and an optical transmission system including the same.

The optical fiber according to the present invention is an optical fiber which enables efficient transmission of both of signal light in the 1.3-$\mu$m wavelength band and signal light in the 1.55-$\mu$m wavelength band, the optical fiber having only one zero-dispersion wavelength within a wavelength range of 1.20 $\mu$m to 1.60 $\mu$m and having a positive dispersion slope at the zero-dispersion wavelength. Here, this zero-dispersion wavelength lies within a wavelength range of 1.37 $\mu$m to 1.50 $\mu$m sandwiched between the 1.3-$\mu$m wavelength band and the 1.55-$\mu$m wavelength band. Also, the above-mentioned dispersion slope preferably has an absolute value of 0.10 ps/nm$^2$/km or less at the above-mentioned zero-dispersion wavelength (preferably 0.06 ps/nm$^2$/km or less at a wavelength of 1.55 $\mu$m), and monotonously changes (e.g.,monotonously increases) at least in a wavelength range of 1.30 $\mu$m to 1.55 $\mu$m.

Thus, since this optical fiber has a zero-dispersion wavelength within the wavelength range of 1.37 $\mu$m to 1.50 $\mu$m including a wavelength of 1.38 $\mu$m at which an increase in transmission loss caused by OH absorption is seen, dispersion occurs to a certain extent in the vicinity of the 1.3-$\mu$m wavelength band and in the vicinity of the 1.55-$\mu$m wavelength band. As a consequence, the optical fiber comprises a structure in which four-wave mixing is hard to occur even when the signal light in the 1.3-$\mu$m wavelength band and the signal light in the 1.55-$\mu$m wavelength band propagate therethrough.

In the case where a thulium-doped fiber amplifier having an amplification band in a 1.47-$\mu$m wavelength band is utilized, the zero-dispersion wavelength is more preferably set within a wavelength range of 1.37 $\mu$m to 1.43 $\mu$m. It is because of the fact that the transmission band can further be widened if the zero-dispersion wavelength is aligned with a skirt of the OH absorption peak (1.38 $\mu$m). In the case where the above-mentioned OH absorption peak is kept low by dehydration processing or the like, so as to utilize the wavelength band including the wavelength of 1.38 $\mu$m as its signal light wavelength band, on the other hand, the zero-dispersion wavelength may be set within a wavelength range of longer than 1.45 $\mu$m but not longer than 1.50 $\mu$m in order to intentionally generate dispersion in the above-mentioned wavelength band.

In the optical fiber, while the dispersion slope monotonously increases, the absolute value of the dispersion slope at its zero-dispersion wavelength is 0.10 ps/nm$^2$/km or less, and the dispersion slope at a wavelength of 1.55 $\mu$m is preferably 0.06 ps/nm²/km or less, whereby the dispersion in the 1.3-μm wavelength band and the dispersion in the 1.55-μm wavelength band are homogenized. Here, each of the absolute value of dispersion in the 1.3-μm wavelength band and the absolute value of dispersion in the 1.55-μm wavelength band is 6 ps/nm/km or more but 12 ps/nm/km or less.

As mentioned above, the optical fiber according to the present invention realizes efficient optical communications in both of the 1.3-μm wavelength band and the 1.55-μm wavelength band. From the viewpoint of guaranteeing a single mode, the case where the cutoff wavelength is 1.3 μm or shorter while the transmission line length is several hundreds of meters or less is preferable since only the ground-mode light can propagate in each of the 1.3-μm wavelength band and the 1.55-μm wavelength band. Also, in view of the dependence of cutoff wavelength on distance, no practical problem occurs in optical transmission over a relatively long distance (a transmission line length of several kilometers or less) even if the cutoff wavelength is 1.45 μm or shorter (in the case where it is longer than the signal light wavelength). From the viewpoint of reducing the bending loss, on the other hand, there are cases where the bending loss increases remarkably when the cutoff wavelength is shorter than 1.0 μm. As a consequence, the cutoff wavelength is preferably 1.05 μm or more, more preferably 1.30 μm or more.

Further, in order to enable efficient optical transmission in the 1.3-μm wavelength band and 1.55-μm wavelength band, the optical fiber according to the present invention has a bending loss which becomes 0.5 dB or less, preferably 0.06 dB or less, per turn when wound at a diameter of 32 mm at a wavelength of 1.55 μm, and has an effective area $A_{eff}$ which becomes 45 μm² or more, preferably greater than 49 μm² at a wavelength of 1.55 μm. Also, the amount of increase in transmission loss caused by OH absorption at a wavelength of 1.38 μm in the optical fiber is 0.1 dB/km or less. In particular, if the amount of increase in transmission loss caused by OH absorption at a wavelength of 1.38 μm is 0.1 dB/km or less, then a wavelength band in the vicinity of this wavelength of 1.38 μm can be utilized for a signal light wavelength band. In this case, in order to intentionally generate dispersion in the wavelength band in the vicinity of the wavelength of 1.38 μm (in order to suppress four-wave mixing), the zero-dispersion wavelength may be set within a wavelength range of longer than 1.45 μm but not longer than 1.50 μm.

Here, the effective area $A_{eff}$ is given, as shown in Japanese Patent Application Laid-Open No. HEI 8-248251 (EP 0 724 171 A2), by the following expression (1):

$$A_{eff} = 2\pi \left( \int_0^\infty E^2 r dr \right)^2 \Big/ \left( \int_0^\infty E^4 r dr \right) \qquad (1)$$

where E is the electric field accompanying the propagated light, and r is the radial distance from the core center.

The optical fiber according to the present invention has a refractive index profile in which the maximum and minimum values of relative refractive index difference with reference to the refractive index of pure silica (silica which is not intentionally doped with impurities) are 1% or less and −0.5% or more, respectively. In such a refractive index profile, the relative refractive index difference of a high refractive index region doped with Ge element, for example, with respect to pure silica is 1% or less, whereas the relative refractive index difference of a low refractive index region doped with F element, for example, with respect to pure silica is −0.5% or more, whereby its manufacture (refractive index control by doping with impurities) is easy, and the transmission loss can be lowered. Here, the minimum value of relative refractive index difference with reference to the refractive index of pure silica is preferably −0.2% or more, more preferably greater than −0.15% from the viewpoint of facilitating the manufacture of the optical fiber.

The optical fiber having various characteristics such as those mentioned above can be realized by various configurations. Namely, a first configuration of the optical fiber can be realized by a structure comprising a core region which extends along a predetermined axis and has a predetermined refractive index, and a cladding region provided on the outer periphery of the core region. The optical fiber of the first configuration may further comprise a depressed cladding structure. The depressed cladding structure is realized when the above-mentioned cladding region is constituted by an inner cladding, provided on the outer periphery of the core region, having a lower refractive index than the core region; and an outer cladding, provided on the outer periphery of the inner cladding, having a refractive index higher than that of the inner cladding but lower than that of the core region.

As with the first configuration, a second configuration of the optical fiber comprises a core region and a cladding region provided on the outer periphery of the core region. However, the core region is constituted by a first core having a predetermined refractive index; and a second core, provided on the outer periphery of the first core, having a lower refractive index than the first core. In the case where the optical fiber of the second configuration comprises a depressed cladding structure, the cladding region is constituted by an inner cladding, in contact with the outer periphery of the second core, having a lower refractive index than the second core; and an outer cladding, provided on the outer periphery of the inner cladding, having a refractive index higher than that of the inner cladding but lower than that of the second core.

As with the first configuration, a third configuration of the optical fiber comprises a core region extending along a predetermined axis and a cladding region provided on the outer periphery of the core region. In particular, the core region comprises a first core having a predetermined refractive index; a second core, provided on the outer periphery of the first core, having a lower refractive index than the first core; and a third core, provided on the outer periphery of the second core, having a higher refractive index than the second core. In the case where the optical fiber of the third configuration comprises a depressed cladding structure, the cladding region is constituted by an inner cladding, in contact with the outer periphery of the third core, having a lower refractive index than the third core; and an outer cladding, provided on the outer periphery of the inner cladding, having a refractive index higher than that of the inner cladding but lower than that of the third core.

When the third configuration mentioned above is employed, it becomes easier to obtain an optical fiber having allow dispersion slope of 0.06 ps/nm²/km or less at a wavelength of 1.55 μm in particular.

Further, a fourth configuration of the optical fiber also comprises a core region extending along a predetermined axis and a cladding region provided on the outer periphery of the core region. In particular, the core region comprises a first core having a predetermined refractive index; a second core, provided on the outer periphery of the first core, having a higher refractive index than the first core. In the case where the optical fiber of the fourth configuration comprises a depressed cladding structure, the cladding region is constituted by an inner cladding, in contact with the outer periphery of the second-rate, having a lower refractive index than the second core; and an outer cladding, provided on the outer periphery of the inner cladding, having a refractive index higher than that of the inner cladding but lower than that of the second core.

A fifth configuration of the optical fiber comprises a core region extending along a predetermined axis and a cladding region provided on the outer periphery of the core region. In particular, the core region comprises a first core having a predetermined refractive index; a second core, provided on the outer periphery of the first core, having a higher refractive index than the first core; a third core, provided on the outer periphery of the second core, having a lower refractive index than the second core; and a fourth core, provided on the outer periphery of the third core, having a higher refractive index than the third core. In this fifth mode of optical fiber, the cladding region has a lower refractive index than the fourth core.

The optical transmission system according to the present invention is realized by the optical fiber having such a configuration as those mentioned above. Specifically, the optical transmission system according to the present invention comprises, at least, a first transmitter for outputting first light in the 1.3-μm wavelength band, a second transmitter for outputting second light in the 1.55-μm wavelength band, a multiplexer for multiplexing the first light outputted from the first transmitter and the second light outputted from the second transmitter, and an optical fiber comprising a configuration mentioned above and having one end thereof optically connected to the multiplexer. As a result of this structure, the optical fiber transmits each of the first light and second light multiplexed by the multiplexer. According to the optical transmission system having such a structure, the first light in the 1.3-μm wavelength band outputted from the first transmitter is made incident on the above-mentioned optical fiber by way of the multiplexer and propagates through the optical fiber toward a receiving system. On the other hand, the second light in the 1.55-μm wavelength band outputted from the second transmitter is made incident on the optical fiber by way of the multiplexer and propagates through the optical fiber toward the receiving system. Also, as mentioned above, the optical fiber applied to the optical transmission line comprises a structure enabling efficient optical communications in each of the 1.3-μm wavelength band and 1.55-μm wavelength band, whereby the optical transmission system enables large-capacity communications when the optical fiber having such a special structure is employed therein.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 1A is a graph showing a transmission loss characteristic of an optical fiber according to the present invention with respect to wavelength, whereas

FIG. 2A is a view showing a cross-sectional structure of first and thirteenth embodiments of the optical fiber according to the present invention, whereas

FIG. 11 is a table listing various characteristics of the optical fibers according to the first to thirteenth embodiments having various refractive index profiles as shown in FIGS. 2B and 3 to 10;

FIG. 12 is a table listing various characteristics of the optical fibers according to the fourteenth to twenty-second embodiments;

FIG. 17A is a graph showing relationships between effective area $A_{eff}$ and dispersion slope at a wavelength of 1.55 μm mainly concerning the eighteenth to twenty-second embodiments, whereas FIG. 18A is a view showing a schematic configuration of the optical transmission system according to the present invention, whereas

DETAILED DESCRIPTION OF THE PREFERRED EMBODIMENTS

In the following, embodiments of the optical fiber and optical transmission system according to the present invention will be explained with reference to FIGS. 1A to 2B, 3 to 16, and 17A to 18B. Among the drawings, constituents identical to each other will be referred to with numerals or letters identical to each other without repeating their overlapping explanations.

Figure 1A:
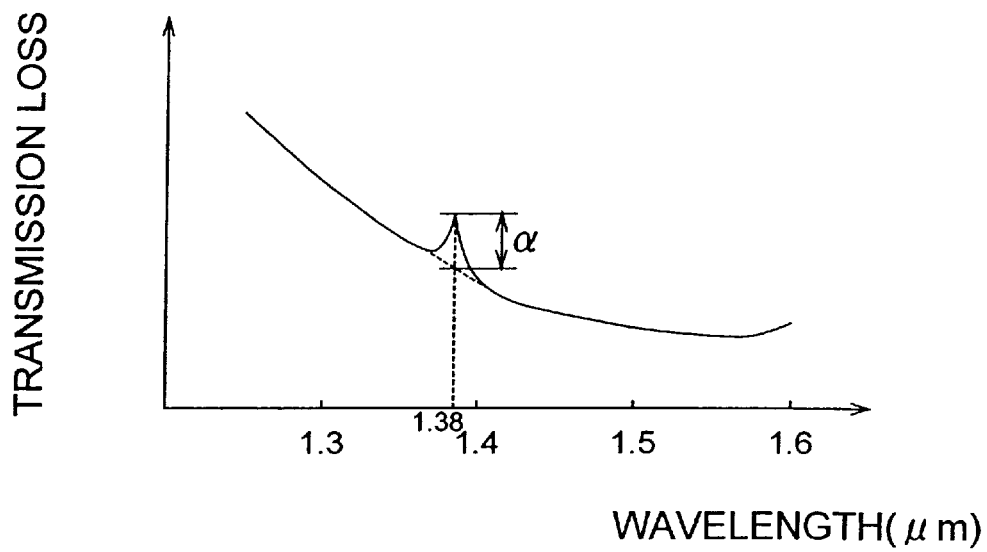
Figure 1B:
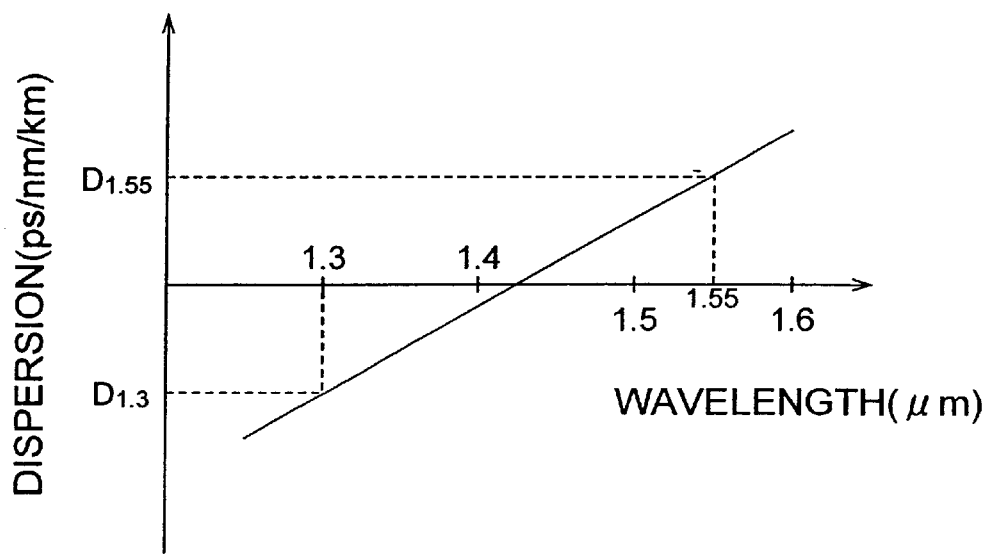
FIG. 1B is a graph showing a dispersion characteristic of the optical fiber according to the present invention with respect to wavelength.

First, FIG. 1A is a graph showing a transmission loss characteristic of an optical fiber according to the present invention with respect to wavelength, whereas FIG. 1B is a graph showing a dispersion characteristic of the optical fiber according to the present invention with respect to wavelength.

The optical fiber according to the present invention has only one zero-dispersion wavelength within a wavelength range of 1.20 μm to 1.60 μm, whereas this zero-dispersion wavelength exists within a wavelength range of 1.37 μm to 1.50 μm. Since a transmission loss due to OH absorption occurs near a wavelength of 1.38 μm as shown in the graph of FIG. 1A (see, for example, KAZUHIRO NOGUCHI et al., "Loss Increase for Optical Fibers Exposed to Hydrogen Atmosphere," JOURNAL OF LIGHTWAVE TECHNOLOGY, VOL. LT-3, NO. 2, APRIL 1985), it is not always favorable to apply signal light in the vicinity of this wavelength to optical communications. Therefore, as shown in FIG. 1B, the zero-dispersion wavelength in the optical fiber according to the present invention is set within a wavelength range of 1.37 μm to 1.43 μm including the wavelength of 1.38 μm at which the transmission loss due to OH absorption occurs, but is kept from being set in the vicinity of the 1.3-μm wavelength band and 1.5-μmwavelength band sandwiching this wavelength band. When the wavelength band including the wavelength of 1.38 μm is utilized as a signal light wavelength band, the zero-dispersion wavelength may be set within a range of longer than 1.45 μm but not longer than 1.50 μm. Thus, the 1.3-μm wavelength band and 1.55-μm wavelength band deviated from a predetermined wavelength band including the zero-dispersion wavelength are utilized as a signal wavelength band in the optical fiber according to the present invention, so that dispersion is intentionally generated in these wavelength bands, while the occurrence of four-wave mixing is effectively suppressed. When the zero-dispersion wavelength is set within the range of 1.37 μm to 1.43 μm as mentioned above, the transmission band can further be widened by use of a thulium-doped fiber amplifier whose amplification band lies in a 1.47-μm wavelength band. In the case where the above-mentioned OH absorption peak is kept low by dehydration processing or the like, so as to utilize the wavelength band including the wavelength of 1.38 μm as a signal light wavelength band, on the other hand, the zero-dispersion wavelength may be set within a wavelength range of longer than 1.45 μm but not longer than 1.50 μm in order to intentionally generate dispersion in the above-mentioned wavelength band.

Also, the optical fiber according to the present invention has a dispersion with an absolute value of 0.10 ps/nm$^2$/km or less at the above-mentioned zero-dispersion wavelength (preferably 0.06 ps/nm$^2$/km or less at a wavelength of 1.55 μm), thereby being able to realize homogenization of the respective dispersions in the 1.3-μm wavelength band and 1.55-μm wavelength band. Here, in this optical fiber, each of the absolute value of dispersion $D_{1.3}$ at a wavelength of 1.3 μm and the absolute value of dispersion $D_{1.55}$ at a wavelength of 1.55 μm is 6 ps/nm/km or more but 12 ps/nm/km or less. Even in view of the fact that a standard single-mode optical fiber having a zero-dispersion wavelength in the 1.3-μm wavelength band has a dispersion value of about 17 ps/nm/km in the 1.55-μm wavelength band, the optical fiber according to the present invention has a sufficiently small absolute value of dispersion (12 ps/nm/km or less) in each of the 1.3-μm wavelength band and 1.55-μm wavelength band, thus being more suitably utilized in optical communications. Since dispersion occurs to an appropriate extent (6 ps/nm/km or more) in these wavelength bands, on the other hand, four-wave mixing can effectively be kept from occurring.

Further, from the viewpoint of guaranteeing a single mode, the optical fiber according to the present invention preferably has a cutoff wavelength of 1.3 μm or shorter when its transmission length is not longer than several hundreds of meters. In this case, only ground-mode light can propagate in each of the 1.3-μm wavelength band and 1.55-μm wavelength band. Also, in view of the dependence of cutoff wavelength on distance, the cutoff wavelength may be 1.45 μm or shorter in optical transmission over a relatively long distance (a transmission line length of several kilometers or less). In this specification, the cutoff wavelength is that of LP11 mode measured in a state where an optical fiber having a length of 2 m is wound by only one turn at a radius of 140 mm as defined in a CCITT standard. From the viewpoint of reducing the bending loss, there are cases where the bending loss remarkably increases when the cutoff wavelength is shorter than 1.0 μm. Therefore, the cutoff wavelength is preferably 1.05 μm or more, more preferably 1.30 μm or more.

As mentioned above, the optical fiber according to the present invention is a single-mode optical fiber in which a zero-dispersion wavelength is set within a wavelength range deviated from both of the 1.3-μm wavelength band and 1.55-μm wavelength band, while the dispersion value is small in each wavelength band, whereby it is suitable as a transmission medium in an optical communication system utilizing a plurality of wavelength bands.

The optical fiber according to the present invention preferably has a dispersion slope monotonously changing within a wavelength range of 1.30 μm to 1.55 μm (monotonously increasing in the case shown in FIG. 1B). This case is preferable not only in that only one zero-dispersion wavelength can be set within a wavelength range of 1.20 μm to 1.60 μm, but also in that the dispersion in each of the 1.3-μm wavelength band and 1.55-μmwavelength band would not approach zero (because nonlinear optical phenomena are likely to occur when the dispersion approaches zero).

The optical fiber according to the present invention preferably has a bending loss of 0.5 dB/turn or less, more preferably 0.06 dB/turn or less at a wavelength of 1.55 μm when wound at a diameter of 32 mm. In this case, since the bending loss is sufficiently small, the increase in loss caused by cabling and the like can effectively be suppressed. Here, this bending loss (dB/turn) is a value obtained when the transmission loss of light having a wavelength of 1.55 μm concerning an optical fiber wound about a mandrel having a diameter of 32 mm is converted into a loss value per turn.

In the optical fiber according to the present invention, the effective area $A_{eff}$ at a wavelength of 1.55 μm is preferably 45 μm or more, more preferably greater than 49 μm. This value is on a par with or greater than the effective area in a conventional dispersion-shifted optical fiber having a zero-dispersion wavelength in the 1.55-μm wavelength band, so that the optical intensity per unit cross-sectional area decreases, whereby the occurrence of nonlinear optical phenomena such as four-wave mixing is effectively suppressed.

In the optical fiber according to the present invention, the amount of increase α in transmission loss caused by OH absorption at a wavelength of 1.38 µm is preferably 0.1 dB/km or less. It is because of the fact that the wavelength band applicable to optical communications is widened thereby, so as to enable larger-capacity optical communications. In the case where a wavelength band including a wavelength of 1.38 µm is utilized as a signal light wavelength band, the zero-dispersion wavelength is preferably designed to lie within a wavelength range of longer than 1.45 µm but not longer than 1.50 µm deviated from the above-mentioned wavelength band, in order to suppress the occurrence of nonlinear optical phenomena.

Preferably, the optical fiber according to the present invention has a refractive index profile in which the maximum and minimum values of relative refractive index difference with reference to the refractive index of pure silica (silica which is not intentionally doped with impurities) are 1% or less and −0.5% or more, respectively. Since the relative refractive index difference of a high refractive index region doped with Ge element, for example, with respect to pure silica is 1% or less, whereas the relative refractive index difference of a low refractive index region doped with F element, for example, with respect to pure silica is −0.5% or more, an optical transmission medium which is relatively easy to make and has a low transmission loss is obtained. For further facilitating the manufacture, the minimum value of relative refractive index difference with reference to the refractive index of pure silica is preferably −0.2% or more, more preferably greater than −0.15%.

First to twenty-second embodiments of the optical fiber according to the present invention will now be explained with reference to FIGS. 2A, 2B, and 3 to 10.

First Embodiment

Figure 2A:
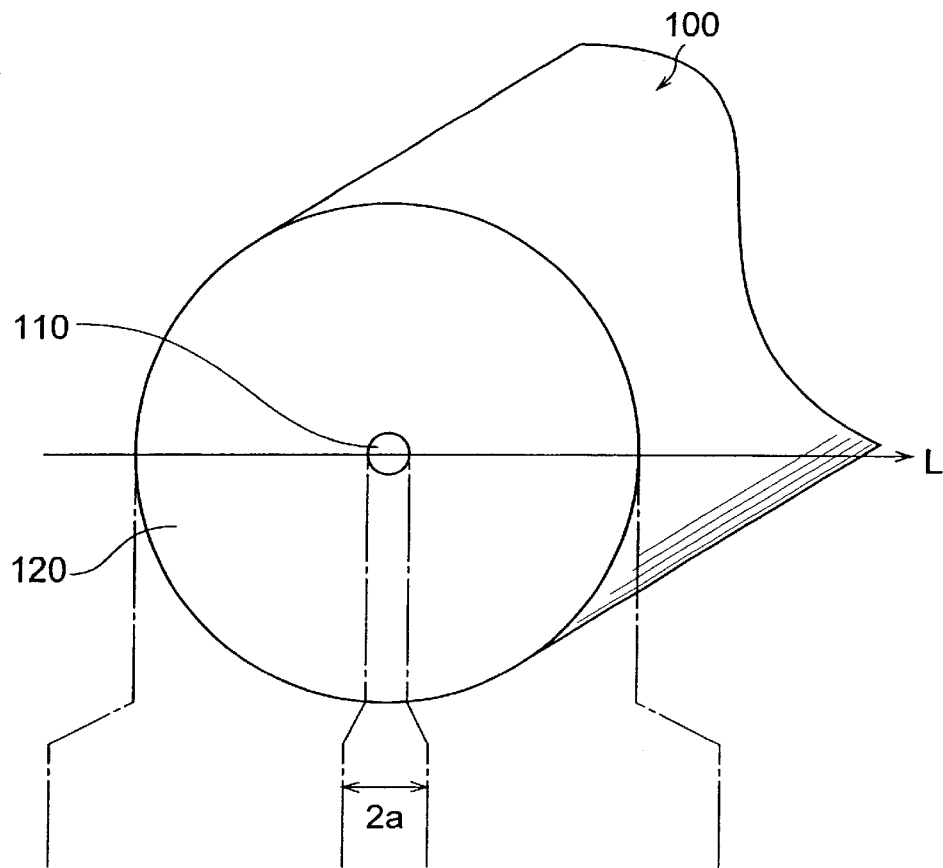
Figure 2B:
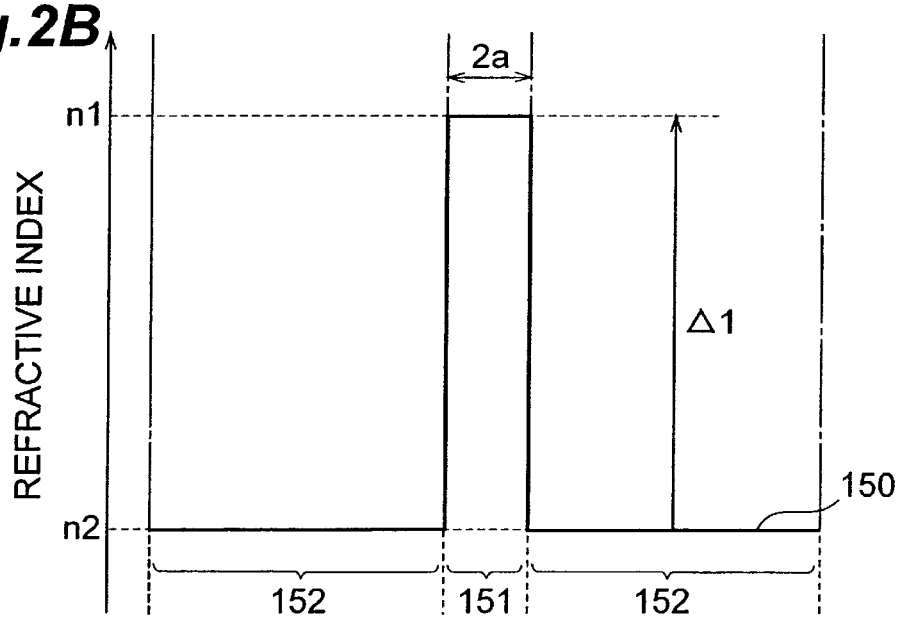
FIG. 2B is a refractive index profile of the optical fiber according to the first embodiment shown in FIG. 2A.

FIG. 2A is a view showing a cross-sectional structure of an optical fiber 100 according to the first embodiment, whereas FIG. 2B is a refractive index profile of the optical fiber 100 shown in FIG. 1A. The optical fiber 100 according to the first embodiment comprises a core region 110, with an outside diameter 2a, extending along a predetermined axis and having a refractive index $n_1$; and a cladding region 120, provided on the outer periphery of the core region 110, having a refractive index $n_2$ ($<n_1$). Here, the refractive index of the core region 110 is higher than that of the cladding region 120. The outside diameter 2a of the core region 110 is 5.2 µm, whereas the relative refractive index difference $\Delta_1$ of the core region 110 with reference to the cladding region 120 is 0.55%. Such an optical fiber is obtained when, while silica is used as a base, the core region 110 is doped with Ge element, for example.

The abscissa of the refractive index profile 150 shown in FIG. 2B corresponds to individual parts, along the line L in FIG. 2A, on a cross section perpendicular to the center axis of the core region 110. Hence, in the refractive index profile 150 of FIG. 2B, areas 151 and 152 indicate the refractive indices in individual parts on the line L of the core region 110 and the cladding region 120, respectively.

Here, the relative refractive index difference $\Delta_1$ of the core region 110 with respect to the outermost cladding region 120 is defined as follows:

$$\Delta_1 = (n_1 - n_2)/n_2$$

where $n_1$ is the refractive index of the core region 110, and $n_2$ is the refractive index of the cladding region 120. Also, in this specification, the relative refractive index difference $\Delta$ is expressed in terms of percentage, and the respective refractive indices of individual regions in the above-mentioned defining expression may be arranged in any order. Consequently, a negative value of $\Delta$ indicates that the refractive index of its corresponding region is lower than that of the cladding region 120.

The optical fiber according to the first embodiment has a zero-dispersion wavelength at 1.44 µm, and only this one zero-dispersion wavelength exists within a wavelength range of 1.20 µm to 1.60 µm. The dispersion slope at the zero-dispersion wavelength is 0.060 ps/nm²/km, the dispersion slope at a wavelength of 1.55 µm is 0.054 ps/nm²/km, and the cutoff wavelength is 0.96 µm. Also, the dispersion slope monotonously increases at least in a wavelength range of 1.30 µm to 1.55 µm; and, specifically, the dispersion at a wavelength of 1.20 µm is −18.5 ps/nm/km, the dispersion at a wavelength of 1.30 µm is −9.6 ps/nm/km, the dispersion at a wavelength of 1.45 µm is 0.6 ps/nm/km, the dispersion at a wavelength of 1.55 µm is 6.2 ps/nm/km, and the dispersion at a wavelength of 1.60 µm is 8.8 ps/nm/km. Further, the bending loss at a wavelength of 1.55 µm when wound at a diameter of 32 mm is 0.06 dB per turn, whereas the effective area $A_{eff}$ at the wavelength of 1.55 µm is 49.1 µm².

Second Embodiment

Figure 3:
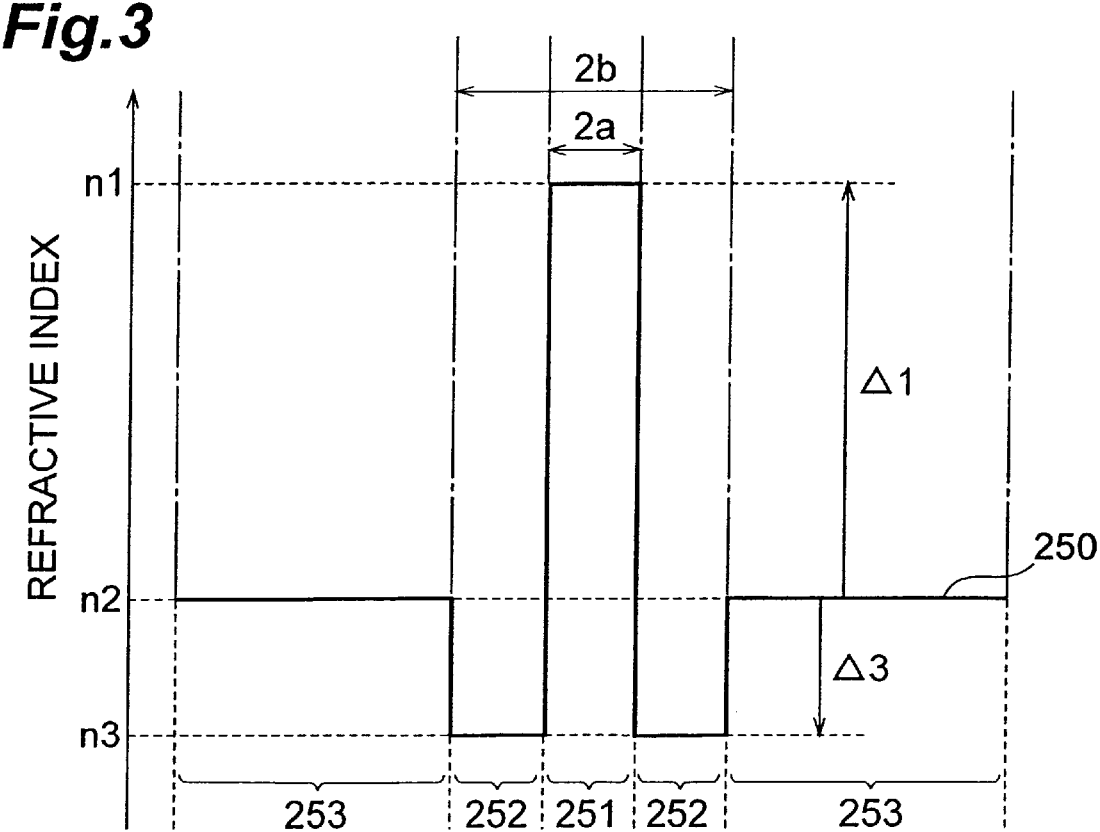
FIG. 3 is a refractive index profile of an optical fiber according to a second embodiment.

FIG. 3 is a refractive index profile of an optical fiber according to the second embodiment. The basic configuration of the optical fiber according to the second embodiment is similar to that of the first embodiment shown in FIG. 2A, but is different therefrom in that the cladding region 120 shown in FIG. 2A is modified to have a depressed cladding structure. Referring to FIG. 2A for explanation, the optical fiber according to the second embodiment comprises a core region 110 with an outside diameter 2a having a refractive index $n_1$, and a cladding region 120 provided on the outer periphery of the core region 110. The cladding region 120 is constituted by an inner cladding with an outside diameter 2b, provided in contact with the core region 110, having a refractive index $n_3$ ($<n_1$); and an outer cladding, provided on the outer periphery of the inner cladding, having a refractive index $n_2$ ($<n_1,>n_3$). Here, the outside diameter 2a of the core region 110 is 5.2 µm, whereas the outside diameter 2b of the inner cladding region is 10.9 µm. Also, with reference to the refractive index $n_2$ of the outer cladding region, the relative refractive index difference $\Delta_1$ ($=(n_1-n_2)/n_2$) of the core region is 0.55%, whereas the relative refractive index difference $\Delta_2$ ($=(n_3-n_2)/n_2$) of the inner cladding is −0.05%. Such an optical fiber is obtained when, for example, while silica is used as a base, the core region and the inner cladding are doped with Ge element and F element, respectively.

As for the relationship between the refractive index profile 250 shown in FIG. 3 and the cross-sectional structure shown in FIG. 2A, the abscissa of the refractive index profile 250 corresponds to individual parts, along the line L in FIG. 2A, on a cross section perpendicular to the center axis of the core region 110. Hence, in the refractive index profile 250 of FIG. 3, areas 251, 252, and 253 indicate the refractive indices in individual parts on the line L of the core region 110, the inner cladding constituting the cladding region 120, and the outer cladding constituting the cladding region 120, respectively.

The optical fiber according to the second embodiment has a zero-dispersion wavelength at 1.46 µm, and only this one zero-dispersion wavelength exists within a wavelength range of 1.20 µm to 1.60 µm. The dispersion slope at the zero-dispersion wavelength is 0.053 ps/nm²/km, the dispersion slope at a wavelength of 1.55 µm is 0.049 ps/nm²/km, and the cutoff wavelength is 0.93 µm. Also, the dispersion slope monotonously increases at least in a wavelength range of 1.30 µm to 1.55 µm; and, specifically, the dispersion at a wavelength of 1.20 µm is −18.5 ps/nm/km, the dispersion at a wavelength of 1.30 µm is −10.1 ps/nm/km, the dispersion at a wavelength of 1.45 µm is −0.5 ps/nm/km, the dispersion at a wavelength of 1.55 µm is 4.3 ps /nm/km, and the dispersion at a wavelength of 1.60 µm is 6.7 ps/nm/km. Further, the bending loss at a wavelength of 1.55 µm when wound at a diameter of 32 mm is 0.20 dB per turn, whereas the effective area $A_{eff}$ at the wavelength of 1.55 µm is 47.2 µm².

Third Embodiment

Figure 4:
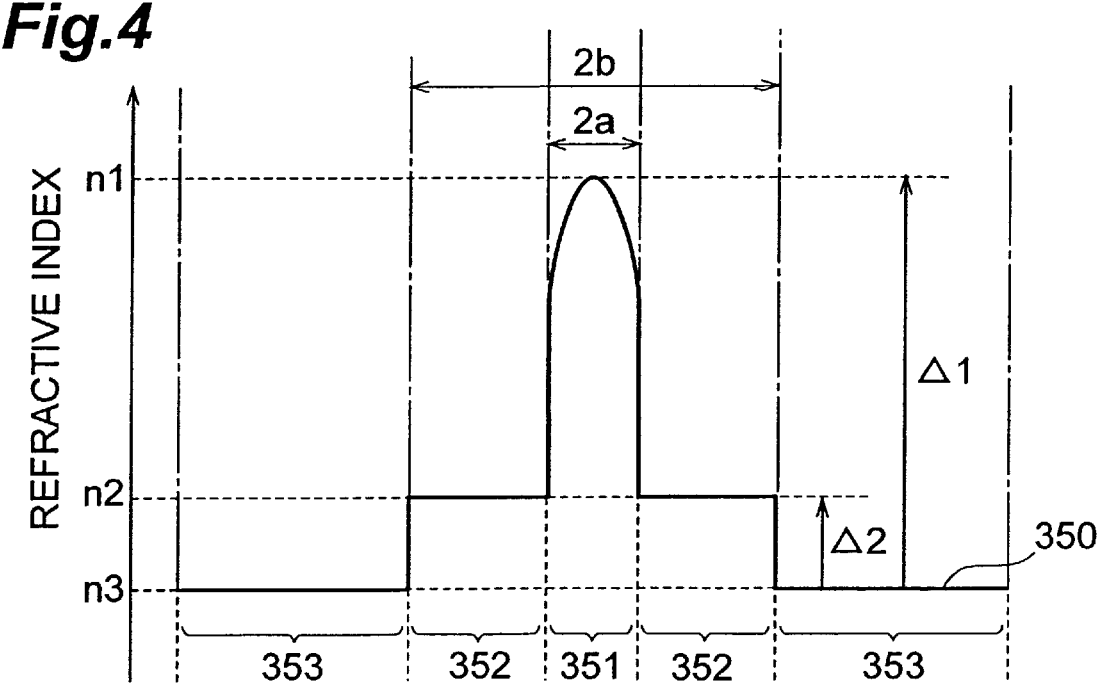
FIG. 4 is a refractive index profile of optical fibers according to third, fifteenth, and seventeenth embodiments.

FIG. 4 is a refractive index profile of an optical fiber according to the third embodiment. The basic configuration of the optical fiber according to the third embodiment is also similar to that of the first embodiment shown in FIG. 2A, but is different therefrom in that the core region 110 shown in FIG. 2A is constituted by a first core and a second core. Referring to FIG. 2A for explaining the configuration of the optical fiber according to the third embodiment, the core region 110 comprises a first core, with an outside diameter 2a, having a maximum refractive index $n_1$ at the optical axis center; and a second core with an outside diameter 2b, provided on the outer periphery of the first core, having a refractive index $n_2$ ($<n_1$). The cladding region 120 provided on the outer periphery of the second core has a refractive index $n_3$ ($<n_2$).

As for the relationship between the refractive index profile 350 shown in FIG. 4 and the cross-sectional structure shown in FIG. 2A, the abscissa of the refractive index profile 350 corresponds to individual parts, along the line L in FIG. 2A, on a cross section perpendicular to the center axis of the core region 110. Hence, in the refractive index profile 350 of FIG. 4, areas 351, 352, and 353 indicate the refractive indices in individual parts on the line L of the first core constituting the core region 110, the second core constituting the core region 110, and the cladding region 120, respectively. Here, the outside diameter 2a of the first core constituting the core region 110 is 6.4 µm, whereas the outside diameter 2b of the second core region is 16.0 µm. With reference to the refractive index $n_3$ of the cladding region 120, the relative refractive index difference $\Delta_1$ ($=(n_1-n_3)/n_3$) of the first core is 0.60%, whereas the relative refractive index difference $\Delta_2$ ($=(n_2-n_3)/n_3$) of the second core is 0.10%. Such an optical fiber is obtained when, for example, while silica is used as a base, the first core and the second core are doped with their respective appropriate amounts of Ge element.

The optical fiber according to the third embodiment has a zero-dispersion wavelength at 1.42 µm, and only this one zero-dispersion wavelength exists within a wavelength range of 1.20 µm to 1.60 µm. The dispersion slope at the zero-dispersion wavelength is 0.079 ps/nm²/km, the dispersion slope at a wavelength of 1.55 µm is 0.070 ps/nm²/km, and the cutoff wavelength is 1.19 µm. Also, the dispersion slope monotonously increases at least in a wavelength range of 1.30 µm to 1.55 µm; and, specifically, the dispersion at a wavelength of 1.20 µm is −20.8 ps/nm/km, the dispersion at a wavelength of 1.30 µm is −10.6 ps/nm/km, the dispersion at a wavelength of 1.45 µm is 2.1 ps/nm/km, the dispersion at a wavelength of 1.55 µm is 9.3 ps/nm/km, and the dispersion at a wavelength of 1.60 µm is 12.8 ps/nm/km. Further, the bending loss at a wavelength of 1.55 µm when wound at a diameter of 32 mm is 0.006 dB per turn, whereas the effective area $A_{eff}$ at the wavelength of 1.55 µm is 63.6 µm².

Fourth Embodiment

Figure 5:
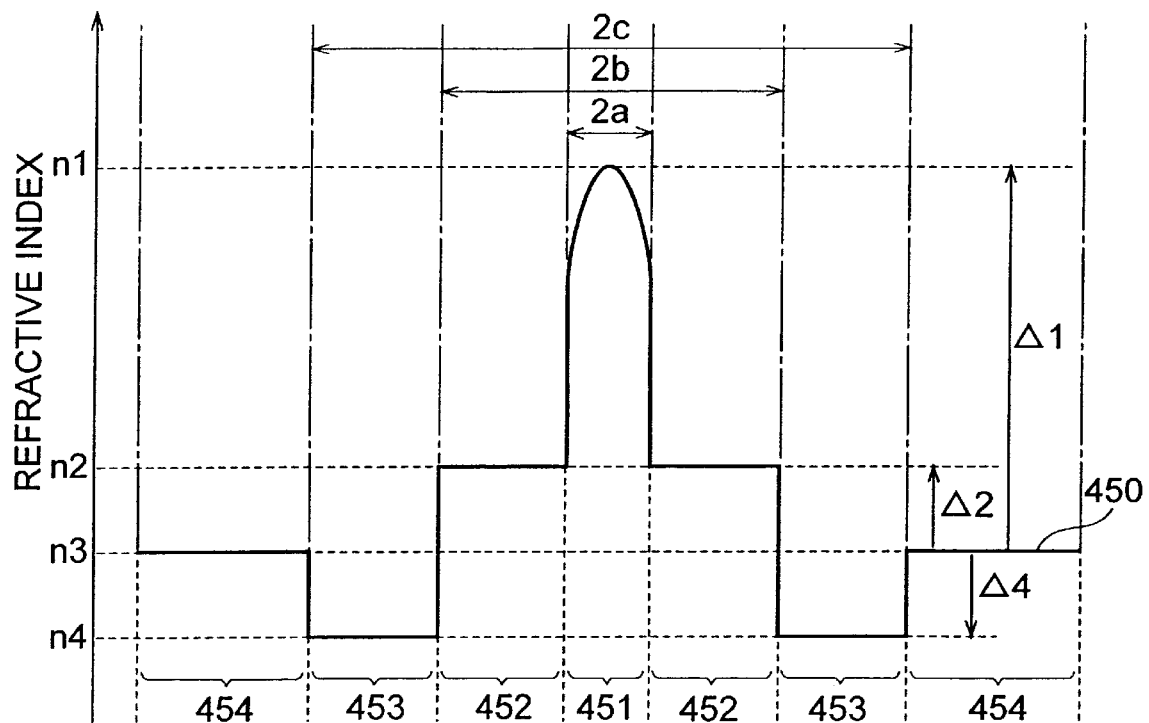
FIG. 5 is a refractive index profile of an optical fiber according to a fourth embodiment.

FIG. 5 is a refractive index profile of an optical fiber according to the fourth embodiment. As in the first embodiment shown in FIG. 2A, the optical fiber according to the fourth embodiment comprises a core region 110 and a cladding region 120. However, it differs from the above-mentioned third embodiment in that the cladding region 120 comprises a depressed structure. Referring to FIG. 2A for explaining the configuration of the optical fiber according to the fourth embodiment, as in the third embodiment, the core region 110 comprises a first core, with an outside diameter 2a, having a maximum refractive index $n_1$ at the optical axis center; and a second core with an outside diameter 2b, provided on the outer periphery of the first core, having a refractive index $n_2$ ($<n_1$). The cladding region 120 comprises an inner cladding with an outside diameter 2c, provided in contact with the outer periphery of the second core, having a refractive index $n_4$ ($<n_2$); and an outer cladding, provided on the outer periphery of the inner cladding, having a refractive index $n_3$ ($>n_4$, $<n_2$).

As for the relationship between the refractive index profile 450 shown in FIG. 5 and the cross-sectional structure shown in FIG. 2A, the abscissa of the refractive index profile 450 corresponds to individual parts, along the line L in FIG. 2A, on a cross section perpendicular to the center axis of the core region 110. Hence, in the refractive index profile 450 of FIG. 5, areas 451, 452, 453, and 454 indicate the refractive indices in individual parts on the line L of the first core constituting the core region 110, the second core constituting the core region 110, the inner cladding constituting the cladding region 120, and the outer cladding constituting the cladding region 120, respectively. Here, the outside diameter 2a of the first core constituting the core region 110 is 6.3 µm, the outside diameter 2b of the second core region is 16.1 µm, and the outside diameter 2c of the inner cladding is 28.8 µm. With reference to the refractive index of pure silica, the relative refractive index difference $\Delta_1$ ($=(n_1-n_3)/n_3$) of the first core is 0.60%, the relative refractive index difference $\Delta_2$ ($=(n_2-n_3)/n_3$) of the second core is 0.10%, and the relative refractive index difference $\Delta_4$ ($=(n_4-n_3)/n_3$) of the inner cladding is −0.05%. Such an optical fiber is obtained when, for example, while silica is used as a base, the first core and the second core are doped with their respective appropriate amounts of Ge element, whereas the inner cladding is doped with F element.

The optical fiber according to the fourth embodiment has a zero-dispersion wavelength at 1.41 µm, and only this one zero-dispersion wavelength exists within a wavelength range of 1.20 µm to 1.60 µm. The dispersion slope at the zero-dispersion wavelength is 0.081 ps/nm²/km, the dispersion slope at a wavelength of 1.55 µm is 0.070 ps/nm²/km, and the cutoff wavelength is 1.15 µm. Also, the dispersion slope monotonously increases at least in a wavelength range of 1.30 µm to 1.55 µm; and, specifically, the dispersion at a wavelength of 1.20 µm is −20.3 ps/nm/km, the dispersion at a wavelength of 1.30 µm is −9.9 ps/nm/km, the dispersion at a wavelength of 1.45 µm is 3.1 ps/nm/km, the dispersion at a wavelength of 1.55 µm is 10.2 ps/nm/km, and the dispersion at a wavelength of 1.60 µm is 13.7 ps/nm/km. Further, the bending loss at a wavelength of 1.55 µm when wound at a diameter of 32 mm is 0.004 dB per turn, whereas the effective area $A_{eff}$ at the wavelength of 1.55 µm is 62.0 µm².

Fifth Embodiment

Figure 6:
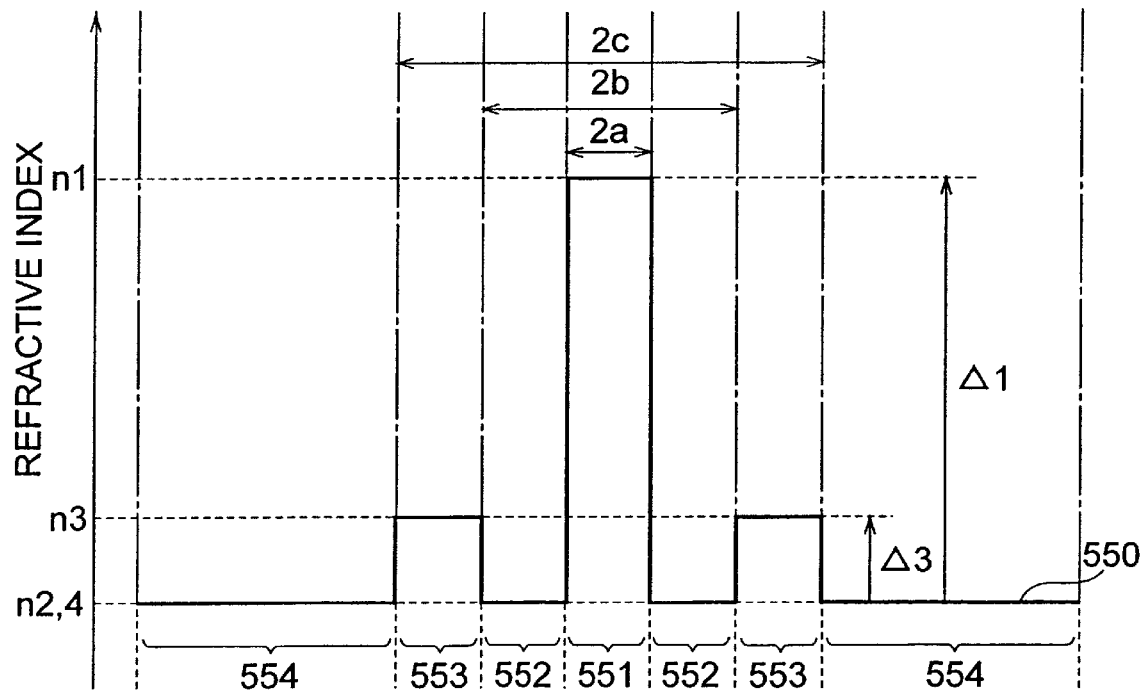
FIG. 6 is a refractive index profile of optical fibers according to fifth, sixteenth, eighteenth, nineteenth, and twenty-first embodiments.

FIG. 6 is a refractive index profile of an optical fiber according to the fifth embodiment. The basic configuration of the optical fiber according to the fifth embodiment is also similar to the first embodiment shown in FIG. 2A, and is constituted by a core region 110 and a cladding region 120. As for the configuration of the optical fiber according to the fifth embodiment shown in FIG. 2A, the core region 110 comprises a first core, with an outside diameter 2a, extending along a predetermined axis and having a refractive index $n_1$; a second core with an outside diameter 2b, provided on the outer periphery of the first core, having a refractive index $n_2$ ($<n_1$); and a third core with an outside diameter 2c, provided on the outer periphery of the second core, having a refractive index $n_3$ ($>n_2$, $<n_1$). The cladding region 120 provided on the outer periphery of the third core 3 has a refractive index $n_4$ ($<n_1$, $<n_3$).

As for the relationship between the refractive index profile 550 shown in FIG. 6 and the cross-sectional structure shown in FIG. 2A, the abscissa of the refractive index profile 550 corresponds to individual parts, along the line L in FIG. 2A, on a cross section perpendicular to the center axis of the core region 110. Hence, in the refractive index profile 550 of FIG. 6, areas 551, 552, 553, and 554 indicate the refractive indices in individual parts on the line L of the first core constituting the core region 110, the second core constituting the core region 110, the third core constituting the core region 110, and the cladding region 120, respectively. Here, the outside diameter 2a of the first core is 5.3 μm, the outside diameter 2b of the second core region is 10.0 μm, and the outside diameter 2c of the third core region is 16.6 μm. With reference to the refractive index of the cladding region, the relative refractive index difference $\Delta_1$ ($=(n_1-n_4)/n_4$) of the first core is 0.58%, the relative refractive index difference of the second core is 0% since it is set such that $n_2=n_4$, and the relative refractive index difference $\Delta_3$ ($=(n_3-n_4)/n_4$) of the third core is 0.14%. Such an optical fiber is obtained when, for example, while silica is used as a base, the first core and the third core are doped with their respective appropriate amounts of Ge element.

The optical fiber according to the fifth embodiment has a zero-dispersion wavelength at 1.48 μm, and only this one zero-dispersion wavelength exists within a wavelength grange of 1.20 μm to 1.60 μm. The dispersion slope at the zero-dispersion wavelength is 0.064 ps/nm²/km, the dispersion slope at a wavelength of 1.55 μm is 0.064 ps/nm²/km, and the cutoff wavelength is 1.24 μm. Also, the dispersion slope monotonously increases at least in a wavelength range of 1.30 μm to 1.55 μm; and, specifically, the dispersion at a wavelength of 1.20 μm is -20.3 ps/nm/km, the dispersion at a wavelength of 1.30 μm is -11.9 ps/nm/km, the dispersion at a wavelength of 1.45 μm is -1.9 ps/nm/km, the dispersion at a wavelength of 1.55 μm is 4.8 ps/nm/km, and the dispersion at a wavelength of 1.60 μm is 8.0 ps/nm/km. Further, the bending loss at a wavelength of 1.55 μm when wound at a diameter of 32 mm is 0.008 dB per turn, whereas the effective area $A_{eff}$ at the wavelength of 1.55 μm is 53.9 μm².

Figure 7:
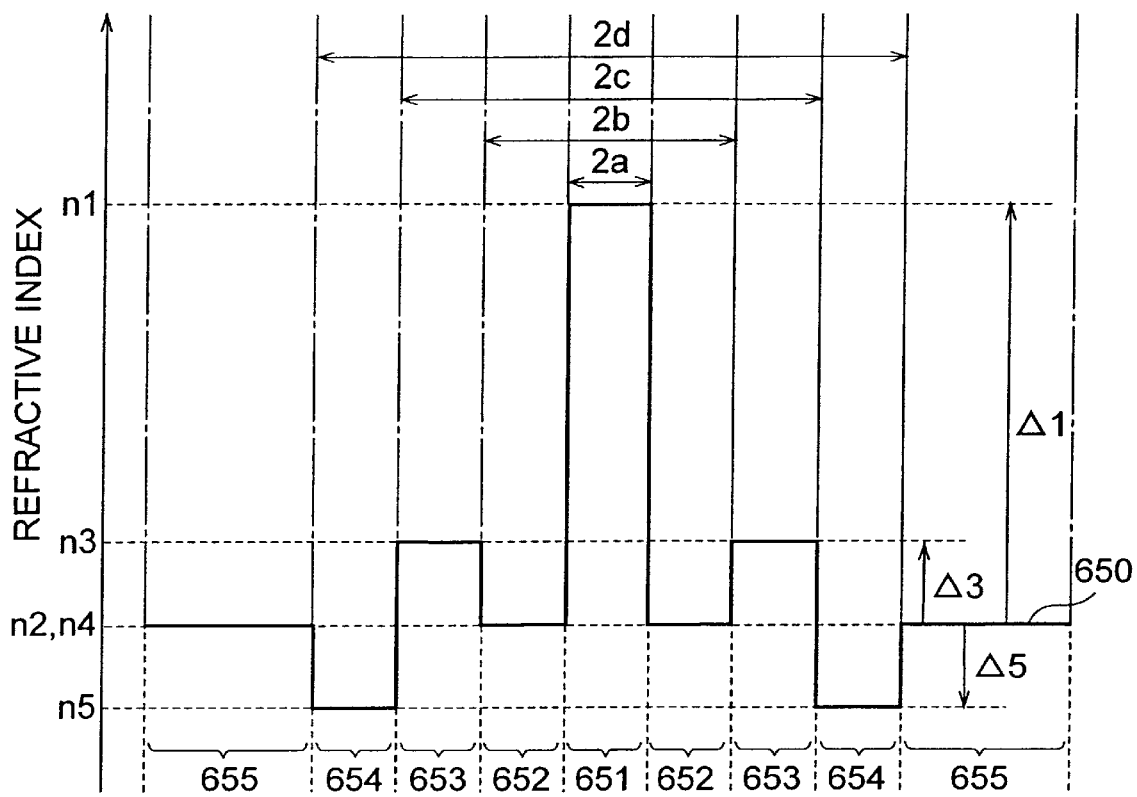
FIG. 7 is a refractive index profile of optical fibers according to sixth, twentieth, and twenty-second embodiments.

Sixth Embodiment FIG. 7 is a refractive index profile of an optical fiber according to the sixth embodiment. As in the first embodiment shown in FIG. 2A, the basic configuration of the optical fiber according to the sixth embodiment comprises a core region 110 and a cladding region 120. However, it differs from the fifth embodiment in that the cladding region 120 comprises a depressed cladding structure. Referring to FIG. 2A for explaining the configuration of the optical fiber according to the sixth embodiment, the core region 110 comprises a first core, with an outside diameter 2a, extending along a predetermined axis and having a refractive index $n_1$; a second core with an outside diameter 2b, provided on the outer periphery of the first core, having a refractive index $n_2$ ($<n_1$); and a third core with an outside diameter 2c, provided on the outer periphery of the second core, having a refractive index $n_3$ ($<n_1$, $>n_2$). The cladding region 120 of depressed cladding structure comprises an inner cladding with an outside diameter 2d, provided on the outer periphery of the third core, having a refractive index $n_5$ ($<n_3$); and an outer cladding, provided on the outer periphery of the inner cladding, having a refractive index $n_4$ ($<n_3$, $>n_5$).

As for the relationship between the refractive index profile 650 shown in FIG. 7 and the cross-sectional structure shown in FIG. 2A, the abscissa of the refractive index profile 650 corresponds to individual parts, along the line L in FIG. 2A, on a cross section perpendicular to the center axis of the core region 110. Hence, in the refractive index profile 650 of FIG. 7, areas 651, 652, 653, 654, and 655 indicate the refractive indices in individual parts on the line L of the first core constituting the core region 110, the second core constituting the core region 110, the third core constituting the core region 110, the inner cladding constituting the cladding region 120, and the outer cladding constituting the cladding region 120, respectively. Here, the outside diameter 2a of the first core is 5.7 μm, the outside diameter 2b of the second core is 16.2 μm, the outside diameter 2c of the third core region is 23.0 μm, and the outside diameter 2d of the inner cladding 2d is 34.4 μm. With reference to the refractive index of the outer cladding region, the relative refractive index difference $\Delta_1$ ($=(n_1-n_4)/n_4$) of the first core is 0.50%, the relative refractive index difference of the second core is 0% since it is set such that $n_2=n_4$, the relative refractive index difference $\Delta_3$ ($=(n_3-n_4)/n_4$) of the third core is 0.16%, and the relative refractive index difference $\Delta_5$ ($=(n_5-n_4)/n_4$) of the inner cladding is -0.10%. Such an optical fiber is obtained when, for example, while silica is used as a base, the first core and the third core are doped with their respective appropriate amounts of Ge element, whereas the inner cladding is doped with F element.

The optical fiber according to the sixth embodiment has a zero-dispersion wavelength at 1.42 μm, and only this one zero-dispersion wavelength exists within a wavelength range of 1.20 μm to 1.60 μm. The dispersion slope at the zero-dispersion wavelength is 0.056 ps/nm²/km, the dispersion slope at a wavelength of 1.55 μm is 0.052 ps/nm²/km, and the cutoff wavelength is 1.23 μm. Also, the dispersion slope monotonously increases at least in a wavelength range of 1.30 μm to 1.55 μm; and, specifically, the dispersion at a wavelength of 1.20 μm is -16.4 ps/nm/km, the dispersion at a wavelength of 1.30 μm is -7.9 ps/nm/km, the dispersion at a wavelength of 1.45 μm is 1.6 ps/nm/km, the dispersion at a wavelength of 1.55 μm is 6.6 ps/nm/km, and the dispersion at a wavelength of 1.60 μm is 9.2 ps/nm/km. Further, the bending loss at a wavelength of 1.55 μm when wound at a diameter of 32 mm is 0.02 dB per turn, whereas the effective area $A_{eff}$ at the wavelength of 1.55 μm is 57.1 μm².

Seventh and Eighth Embodiments

Figure 8:
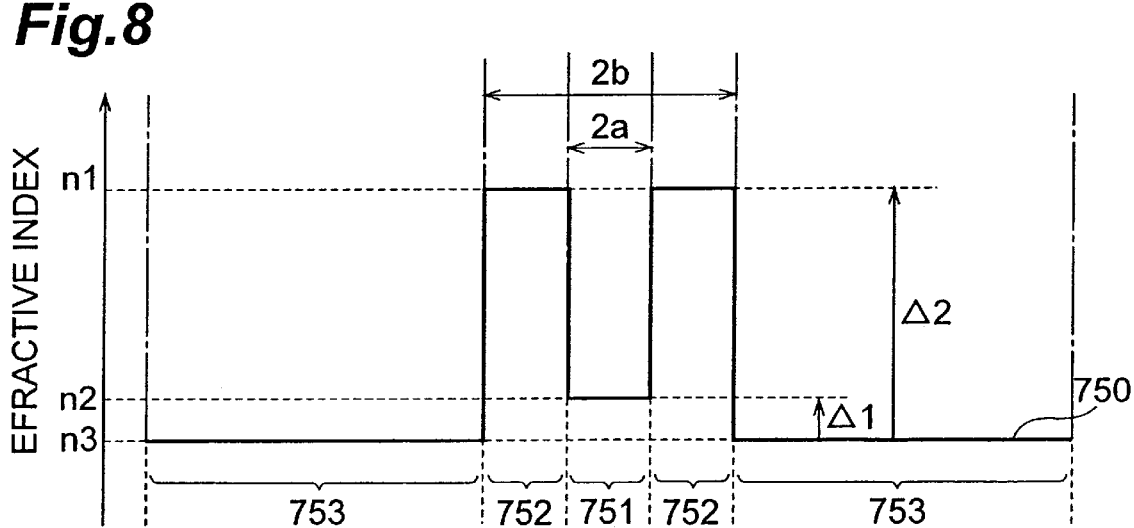
FIG. 8 is a refractive index profile of optical fibers according to seventh and eighth embodiments.

FIG. 8 is a refractive index profile of optical fibers according to the seventh and eighth embodiments. Both of the seventh and eighth embodiments have the same configuration, each comprising a core region 110 and a cladding region 120 as with the first embodiment shown in FIG. 2A. Referring to FIG. 2A for explaining the configuration of the optical fibers according to the seventh and eighth embodiments, the core region 110 comprises a first core, with an outside diameter 2a, extending along a predetermined axis and having a refractive index $n_1$; and a second core with an outside diameter 2b, provided on the outer periphery of the first core, having a refractive index $n_2$ ($>n_1$). The cladding region 120, provided on the outer periphery of the second core, has a refractive index $n_3$ ($<n_2$).

As for the relationship between the refractive index profile 750 shown in FIG. 8 and the cross-sectional structure shown in FIG. 2A, the abscissa of the refractive index profile 750 corresponds to individual parts, along the line L in FIG. 2A, on a cross section perpendicular to the center axis of the core region 110. Hence, in the refractive index profile 750 of FIG. 8, areas 751, 752, and 753 indicate the refractive indices in individual parts on the line L of the first core constituting the core region 110, the second core constituting the core region 110, and the cladding region 120, respectively.

In the optical fiber according to the seventh embodiment, the outside diameter 2a of the first core is 2.8 μm, whereas the outside diameter 2b of the second core is 5.6 μm. With reference to the refractive index of the cladding region, the relative refractive index difference $\Delta_1$ of the first core is 0% since it is set such that $n_1=n_3$, whereas the relative refractive index difference $\Delta_2$ $(=(n_2-n_3)/n_3)$ of the second core is 0.7%. Such an optical fiber is obtained when, for example, while silica is used as a base, the second core is doped with Ge element.

The optical fiber according to the seventh embodiment has a zero-dispersion wavelength at 1.41 μm, and only this one zero-dispersion wavelength exists within a wavelength range of 1.20 μm to 1.60 μm. The dispersion slope at the zero-dispersion wavelength is 0.075 ps/nm²/km, the dispersion slope at a wavelength of 1.55 μm is 0.061 ps/nm²/km, and the cutoff wavelength is 1.10 μm. Also, the dispersion slope monotonously increases at least in a wavelength range of 1.30 μm to 1.55 μm; and, specifically, the dispersion at a wavelength of 1.20 μm is −20.1 ps/nm/km, the dispersion at a wavelength of 1.30 μm is −9.3 ps/nm/km, the dispersion at a wavelength of 1.45 μm is 3.0 ps/nm/km, the dispersion at a wavelength of 1.55 μm is 9.4 ps/nm/km, and the dispersion at a wavelength of 1.60 μm is 12.4 ps/nm/km. Further, the bending loss at a wavelength of 1.55 μm when wound at a diameter of 32 mm is 0.3 dB per turn, whereas the effective area $A_{eff}$ at the wavelength of 1.55 μm is 67.3 μm².

In the optical fiber according to the eighth embodiment, on the other hand, the outside diameter 2a of the first core is 3.2 μm, whereas the outside diameter 2b of the second core is 6.4 μm. With reference to the refractive index of the cladding region, the relative refractive index difference $\Delta_1$ $(=(n_1-n_3)/n_3)$ of the first core is −0.2%, whereas the relative refractive index difference $\Delta_2$ $(=(n_2-n_3)/n_3)$ of the second core is 0.7%. Such an optical fiber is obtained when, for example, while silica is used as a base, the first core and the second core are doped with F element and Ge element, respectively.

The optical fiber according to the eighth embodiment has a zero-dispersion wavelength at 1.42 μm, and only this one zero-dispersion wavelength exists within a wavelength range of 1.20 μm to 1.60 μm. The dispersion slope at the zero-dispersion wavelength is 0.084 ps/nm²/km, the dispersion slope at a wavelength of 1.55 μm is 0.068 ps/nm²/km, and the cutoff wavelength is 1.17 μm. Also, the dispersion slope monotonously increases at least in a wavelength range of 1.30 μm to 1.55 μm; and, specifically, the dispersion at a wavelength of 1.20 μm is −22.9 ps/nm/km, the dispersion at a wavelength of 1.30 μm is −11.1 ps/nm/km, the dispersion at a wavelength of 1.45 μm is 2.4 ps/nm/km, the dispersion at a wavelength of 1.55 μm is 9.9 ps/nm/km, and the dispersion at a wavelength of 1.60 μm is 13.2 ps/nm/km. Further, the bending loss at a wavelength of 1.55 μm when wound at a diameter of 32 mm is 0.2 dB per turn, whereas the effective area $A_{eff}$ at the wavelength of 1.55 μm is 79.1 μm².

Ninth and Tenth Embodiments

Figure 9:
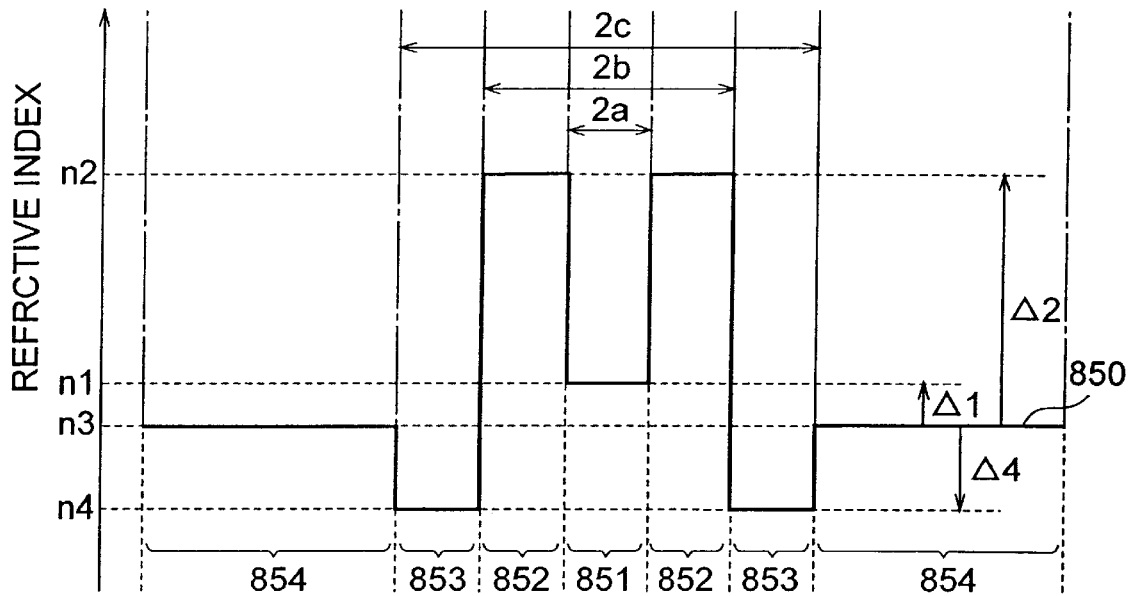
FIG. 9 is a refractive index profile of optical fibers according to ninth and tenth embodiments.

FIG. 9 is a refractive index profile of optical fibers according to the ninth and tenth embodiments. Both of the ninth and tenth embodiments have the same configuration, each comprising a core region 110 and a cladding region 120 as with the first embodiment shown in FIG. 2A. However, the ninth and tenth embodiments differ from the seventh and eighth embodiments in that the cladding region 120 comprises a depressed cladding structure. Referring to FIG. 2A for explaining the configuration of the optical fibers according to the ninth and tenth embodiments, the core region 110 comprises a first core, with an outside diameter 2a, extending along a predetermined axis and having a refractive index $n_1$; and a second core with an outside diameter 2b, provided on the outer periphery of the first core, having a refractive index $n_2$ ($>n_1$). The cladding region with the depressed cladding structure comprises an inner cladding with an outside diameter 2c, provided on the outer periphery of the second core, having a refractive index $n_4$ ($<n_1$); and an outside cladding, provided on the outer periphery of the inner cladding, having a refractive index $n_3$ ($>n_4$).

As for the relationship between the refractive index profile 850 shown in FIG. 9 and the cross-sectional structure shown in FIG. 2A, the abscissa of the refractive index profile 850 corresponds to individual parts, along the line L in FIG. 2A, on a cross section perpendicular to the center axis of the core region 110. Hence, in the refractive index profile 850 of FIG. 9, areas 851, 852, 853, and 854 indicate the refractive indices in individual parts on the line L of the first core constituting the core region 110, the second core constituting the core region 110, the inner cladding constituting the cladding region 120, and the outer cladding constituting the cladding region 120, respectively.

In the optical fiber according to the ninth embodiment, the outside diameter 2a of the first core is 3.8 μm, the outside diameter 2b of the second core is 7.1 μm, and the outside diameter 2c of the inner cladding is 10.6 μm. With reference to the refractive index of the outer cladding, the relative refractive index difference $\Delta_1$ of the first core is 0% since it is set such that $n_1=n_3$, the relative refractive index difference $\Delta_2$ $(=(n_2-n_3)/n_3)$ of the second core is 0.7%, and the relative refractive index difference $\Delta_4$ $(=(n_4-n_3)/n_3)$ of the inner cladding is −0.2%. Such an optical fiber is obtained when, for example, while silica is used as a base, the second core and the inner cladding are doped with Ge element and F element, respectively.

The optical fiber according to the ninth embodiment has a zero-dispersion wavelength at 1.42 μm, and only this one zero-dispersion wavelength exists within a wavelength range of 1.20 μm to 1.60 μm. The dispersion slope at the zero-dispersion wavelength is 0.077 ps/nm²/km, the dispersion slope at a wavelength of 1.55 μm is 0.061 ps/nm²/km, and the cutoff wavelength is 1.22 μm. Also, the dispersion slope monotonously increases at least in a wavelength range of 1.30 μm to 1.55 μm; and, specifically, the dispersion at a wavelength of 1.20 μm is −21.6 ps/nm/km, the dispersion at a wavelength of 1.30 μm is −10.2 ps/nm/km, the dispersion at a wavelength of 1.45 μm is 2.2 ps/nm/km, the dispersion at a wavelength of 1.55 μm is 9.1 ps/nm/km, and the dispersion at a wavelength of 1.60 μm is 12.1 ps/nm/km. Further, the bending loss at a wavelength of 1.55 μm when wound at a diameter of 32 mm is 0.2 dB per turn, whereas the effective area $A_{eff}$ at the wavelength of 1.55 μm is 73.5 μm².

In the optical fiber according to the tenth embodiment, on the other hand, the outside diameter 2a of the first core is 2.6 μm, the outside diameter 2b of the second core is 6.4 μm, and the outside diameter 2c of the inner cladding is 9.6 μm. With reference to the refractive index of the outer cladding, the relative refractive index difference $\Delta_1$ $(=(n_1-n_3)/n_3)$ of the first core is −0.2%, the relative refractive index difference $\Delta_2$ (=($n_2$−$n_3$)/$n_3$) of the second core is 0.7%, and the relative refractive index difference $\Delta_4$ (=($n_4$−$n_3$)/$n_3$) of the inner cladding is −0.2%. Such an optical fiber is obtained when, for example, while silica is used as a base, the second core is doped with Ge element, whereas the first core and the inner cladding are each doped with F element.

The optical fiber according to the tenth embodiment has a zero-dispersion wavelength at 1.44 µm, and only this one zero-dispersion wavelength exists within a wavelength range of 1.20 µm to 1.60 µm. The dispersion slope at the zero-dispersion wavelength is 0.070 ps/nm²/km, the dispersion slope at a wavelength of 1.55 µm is 0.058 ps/nm²/km, and the cutoff wavelength is 1.18 µm. Also, the dispersion slope monotonously increases at least in a wavelength range of 1.30 µm to 1.55 µm; and, specifically, the dispersion at a wavelength of 1.20 µm is −21.5 ps/nm/km, the dispersion at a wavelength of 1.30 µm is −10.8 ps/nm/km, the dispersion at a wavelength of 1.45 µm is 0.7 ps/nm/km, the dispersion at a wavelength of 1.55 µm is 7.3 ps/nm/km, and the dispersion at a wavelength of 1.60 µm is 10.1 ps/nm/km. Further, the bending loss at a wavelength of 1.55 µm when wound at a diameter of 32 mm is 0.03 dB per turn, whereas the effective area $A_{eff}$ at the wavelength of 1.55 µm is 59.6 µm².

Eleventh and Twelfth Embodiments

Figure 10:
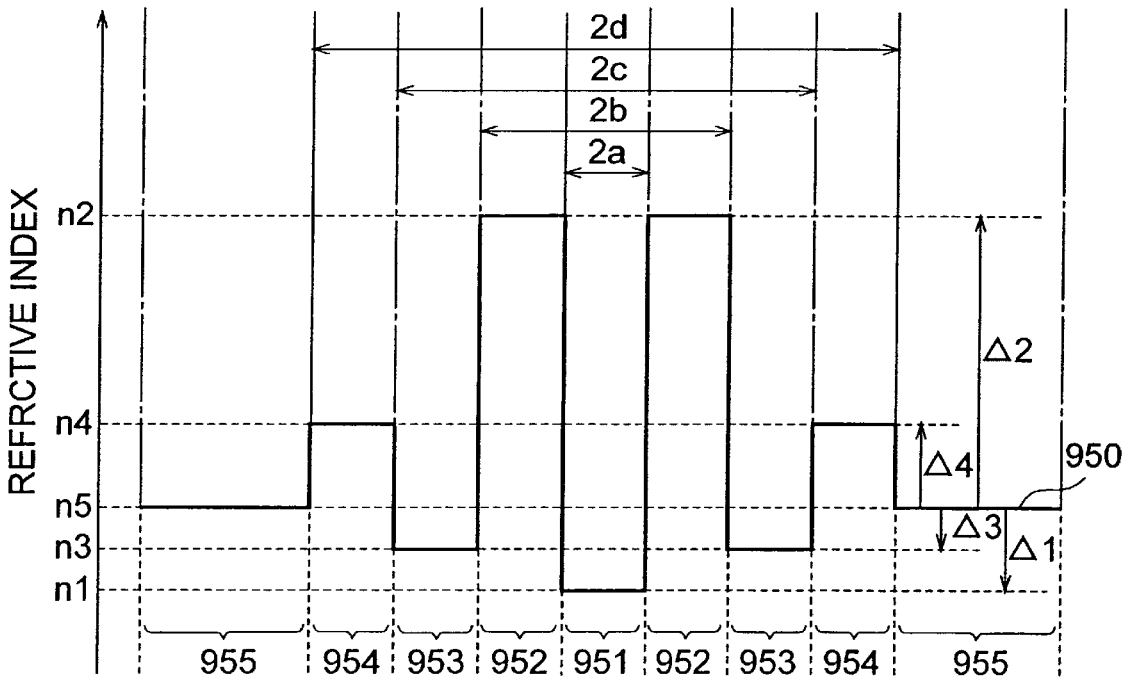
FIG. 10 is a refractive index profile of optical fibers according to eleventh and twelfth embodiments.

FIG. 10 is a refractive index profile of optical fibers according to the eleventh and twelfth embodiments. Both of the eleventh and twelfth embodiments have the same configuration, each comprising a core region 110 and a cladding region 120 as with the first embodiment shown in FIG. 2A. Referring to FIG. 2A for explaining the configuration of the optical fibers according to the eleventh and twelfth embodiments, the core region 110 comprises a first core, with an outside diameter 2a, extending along a predetermined axis and having a refractive index $n_1$; a second core with an outside diameter 2b, provided on the outer periphery of the first core, having a refractive index $n_2$ (>$n_1$); a third core with an outside diameter 2c, provided on the outer periphery of the second core, having a refractive index $n_3$ (<$n_2$); and, a fourth core with an outside diameter 2d, provided on the outer periphery of the third core, having a refractive index $n_4$ (<$n_2$, >$n_3$). The cladding region 120 provided on the outer periphery of the fourth core has a refractive index $n_5$ (<$n_4$).

As for the relationship between the refractive index profile 950 shown in FIG. 10 and the cross-sectional structure shown in FIG. 2A, the abscissa of the refractive index profile 950 corresponds to individual parts, along the line L in FIG. 2A, on a cross section perpendicular to the center axis of the core region 110. Hence, in the refractive index profile 950 of FIG. 10, areas 951, 952, 953, 954, and 955 indicate the refractive indices in individual parts on the line L of the first core constituting the core region 110, the second core constituting the core region 110, the third core constituting the core region 110, the fourth core constituting the core region 110, and the cladding region 120, respectively.

In the optical fiber according to the eleventh embodiment, the outside diameter 2a of the first core is 2.7 µm, the outside diameter 2b of the second core is 5.4 µm, the outside diameter 2b of the third core is 8.1 µm, and the outside diameter 2d of the fourth core is 10.8 µm. With reference to the refractive index of the cladding region, the relative refractive index difference $\Delta_1$ of the first core is 0% since it is set such that $n_1$=$n_3$, the relative refractive index difference $\Delta_2$ (=($n_2$−$n_5$)/$n_5$) of the second core is 0.8%, the relative refractive index difference $\Delta_3$ of the third core is 0% since it is set such that $n_3$=$n_5$, and the relative refractive index difference $\Delta_4$ (=($n_4$−$n_5$)/$n_5$) of the fourth core is 0.1%. Such an optical fiber is obtained when, for example, while silica is used as a base, the second core and the fourth core are each doped with Ge.

The optical fiber according to the eleventh embodiment has a zero-dispersion wavelength at 1.42 µm, and only this one zero-dispersion wavelength exists within a wavelength range of 1.20 µm to 1.60 µm. The dispersion slope at the zero-dispersion wavelength is 0.080 ps/nm²/km, the dispersion slope at a wavelength of 1.55 µm is 0.065 ps/nm²/km, and the cutoff wavelength is 1.16 µm. Also, the dispersion slope monotonously increases at least in a wavelength range of 1.30 µm to 1.55 µm; and, specifically, the dispersion at a wavelength of 1.20 µm is −21.8 ps/nm/km, the dispersion at a wavelength of 1.30 µm is −10.5 ps/nm/km, the dispersion at a wavelength of 1.45 µm is 2.3 ps/nm/km, the dispersion at a wavelength of 1.55 µm is 9.5 ps/nm/km, and the dispersion at a wavelength of 1.60 µm is 12.7 ps/nm/km. Further, the bending loss at a wavelength of 1.55 µm when wound at a diameter of 32 mm is 0.005 dB per turn, whereas the effective area $A_{eff}$ at the wavelength of 1.55 µm is 62.6 µm².

In the optical fiber according to the twelfth embodiment, on the other hand, the outside diameter 2a of the first core is 3.2 µm, the outside diameter 2b of the second core is 7.0 µm, the outside diameter 2c of the third core is 9.0 µm, and the outside diameter 2d of the fourth core 2d is 12.8 µm. With reference to the refractive index of the cladding region, the relative refractive index difference $\Delta_1$ (=($n_1$−$n_5$)/$n_5$) of the first core is −0.2%, the relative refractive index difference $\Delta_2$ (=($n_2$−$n_5$) /$n_5$) of the second core is 0.6%, the relative refractive index difference $\Delta_3$ (=($n_3$−$n_5$)/$n_5$) of the third core is −0.2%, and the relative refractive index difference $\Delta_4$ (=($n_4$−$n_5$)/$n_5$) of the fourth core is 0.1%. Such an optical fiber is obtained when, for example, while silica is used as a base, the second core and the fourth core are each doped with Ge element, whereas the first core and the third core are each doped with F element.

The optical fiber according to the twelfth embodiment has a zero-dispersion wavelength at 1.41 µm, and only this one zero-dispersion wavelength exists within a wavelength range of 1.20 µm to 1.60 µm. The dispersion slope at the zero-dispersion wavelength is 0.088 ps/nm²/km, the dispersion slope at a wavelength of 1.55 µm is 0.071 ps/nm²/km, and the cutoff wavelength is 1.22 µm. Also, the dispersion slope monotonously increases at least in a wavelength range of 1.30 µm to 1.55 µm; and, specifically, the dispersion at a wavelength of 1.20 µm is −22.5 ps/nm/km, the dispersion at a wavelength of 1.30 µm is −10.6 ps/nm/km, the dispersion at a wavelength of 1.45 µm is 3.4 ps/nm/km, the dispersion at a wavelength of 1.55 µm is 11.0 ps/nm/km, and the dispersion at a wavelength of 1.60 µm is 14.5 ps/nm/km. Further, the bending loss at a wavelength of 1.55 µm when wound at a diameter of 32 mm is 0.4 dB per turn, whereas the effective area $A_{eff}$ at the wavelength of 1.55 µm is 92.7 µm².

Thirteenth Embodiment

The thirteenth embodiment of the optical fiber according to the present invention has a cross-sectional structure and a refractive index profile such as those basically shown in FIGS. 2A and 2B. However, the optical fiber according to the thirteenth embodiment differs from the first embodiment in that, while silica is used as a base, the cladding region 120 excluding the core region 110 is doped with fluorine (refractive index lowering agent), so as to generate a relative refractive index difference between the core region 110 and the cladding region 120.

In the optical fiber according to the thirteenth embodiment, the core region 110 made of pure silica (with a refractive index $n_0$) has an outside diameter $2a$ of 5.6 μm. With reference to the refractive index $n_2$ ($<n_0$) of the cladding region 120, the relative refractive index difference $\Delta_1$ ($=(n_0-n_2)/n_2$) of the core region 110 is 0.53%. Also, though the core region 110 is constituted by pure silica (silica which is not intentionally doped with impurities) in the thirteenth embodiment, it may be made of silica doped with chlorine.

The optical fiber according to the thirteenth embodiment has a zero-dispersion wavelength at 1.41 μm, and only this one zero-dispersion wavelength exists within a wavelength range of 1.20 μm to 1.60 μm. The dispersion slope at the zero-dispersion wavelength is 0.057 ps/nm²/km, the dispersion slope at a wavelength of 1.55 μm is 0.048 ps/nm²/km, and the cutoff wavelength is 1.04 μm. Also, the dispersion slope monotonously increases at least in a wavelength range of 1.30 μm to 1.55 μm; and, specifically, the dispersion at a wavelength of 1.20 μm is −15.7 ps/nm/km, the dispersion at a wavelength of 1.30 μm is −7.2 ps/nm/km, the dispersion at a wavelength of 1.45 μm is 2.2 ps/nm/km, the dispersion at a wavelength of 1.55 μm is 7.1 ps/nm/km, and the dispersion at a wavelength of 1.60 μm is 9.4 ps/nm/km. Further, the bending loss at a wavelength of 1.55 μm when wound at a diameter of 32 mm is 0.04 dB per turn, whereas the effective area $A_{eff}$ at the wavelength of 1.55 μm is 52.2 μm².

In addition, the optical fiber according to the thirteenth embodiment yields a transmission loss of 0.17 dB/km at a wavelength of 1.55 μm, thus being an optical fiber of a lower transmission loss as compared with the embodiments whose core region is doped with Ge (yielding a transmission loss of about 0.20 dB/km at the wavelength of 1.55 μm).

Fourteenth Embodiment

The fourteenth embodiment of the optical fiber according to the present invention has a refractive index profile similar to that of the third embodiment shown in FIG. 4, while having an effective area of about 50 μm² at a wavelength of 1.55 μm. However, the profile form of the fourteenth embodiment differs from that of the third embodiment in that the refractive index ($n_1$) of the first core is radially uniform.

As in the above-mentioned third embodiment, the optical fiber according to the fourteenth embodiment comprises a first core having a refractive index $n_1$; a second core, provided on the outer periphery of the first core, having a refractive index $n_2$ ($<n_1$); and a cladding region, provided on the outer periphery of the second core, having a refractive index $n_3$ ($<n_2$).

In the optical fiber according to the fourteenth embodiment, the outside diameter $2a$ of the first core is 5.5 μm, whereas the outside diameter $2b$ of the second core is 23.7 μm. With reference to the refractive index $n_3$ of the cladding region, the relative refractive index difference $\Delta_1$ ($=(n_1-n_3)/n_3$) of the first core is 0.59%, whereas the relative refractive index difference $\Delta_2$ ($=(n_2-n_3)/n_3$) of the second core is 0.06%.

The optical fiber according to the fourteenth embodiment has a zero-dispersion wavelength at 1.41 μm, and only this one zero-dispersion wavelength exists within a wavelength range of 1.20 μm to 1.60 μm. The dispersion slope at the zero-dispersion wavelength is 0.065 ps/nm²/km, the dispersion slope at a wavelength of 1.55 μm is 0.055 ps/nm²/km, and the cutoff wavelength is 1.25 μm. Also, the dispersion slope monotonously increases at least in a wavelength range of 1.30 μm to 1.55 μm; and, specifically, the dispersion at a wavelength of 1.20 μm is −16.8 ps/nm/km, the dispersion at a wavelength of 1.30 μm is −7.7 ps/nm/km, the dispersion at a wavelength of 1.45 μm is 2.5 ps/nm/km, the dispersion at a wavelength of 1.55 μm is 8.5 ps/nm/km, and the dispersion at a wavelength of 1.60 μm is 11.2 ps/nm/km. Further, the bending loss at a wavelength of 1.55 μm when wound at a diameter of 32 mm is 0.00002 dB per turn, whereas the effective area $A_{eff}$ at the wavelength of 1.55 μm is 50.1 μm².

Fifteenth Embodiment

The fifteenth embodiment of the optical fiber according to the present invention also has a refractive index profile similar to that of the third embodiment shown in FIG. 4, while having a zero-dispersion wavelength in the vicinity of 1450 nm. However, the profile form of the fifteenth embodiment differs from that of the third embodiment in that the refractive index ($n_1$) of the first core is radially uniform.

As in the above-mentioned third embodiment, the optical fiber according to the fifteenth embodiment comprises a first core having a refractive index $n_1$; a second core, provided on the outer periphery of the first core, having a refractive index $n_2$ ($<n_1$); and a cladding region, provided on the outer periphery of the second core, having a refractive index $n_3$ ($<n_2$).

In the optical fiber according to the fifteenth embodiment, the outside diameter $2a$ of the first core is 4.8 μm, whereas the outside diameter $2b$ of the second core is 15.1 μm. With reference to the refractive index $n_3$ of the cladding region, the relative refractive index difference $\Delta_1$ ($=(n_1-n_3)/n_3$) of the first core is 0.65%, whereas the relative refractive index difference $\Delta_2$ ($=(n_2-n_3)/n_3$) of the second core is 0.06%.

The optical fiber according to the fifteenth embodiment has a zero-dispersion wavelength at 1.46 (1.457) μm, and only this one zero-dispersion wavelength exists within a wavelength range of 1.20 μm to 1.60 μm. The dispersion slope at the zero-dispersion wavelength is 0.060 ps/nm²/km, the dispersion slope at a wavelength of 1.55 μm is 0.060 ps/nm²/km, and the cutoff wavelength is 1.07 μm. Also, the dispersion slope monotonously increases at least in a wavelength range of 1.30 μm to 1.55 μm; and, specifically, the dispersion at a wavelength of 1.20 μm is −20.2 ps/nm/km, the dispersion at a wavelength of 1.30 μm is −11.1 ps/nm/km, the dispersion at a wavelength of 1.45 μm is −0.6 ps/nm/km, the dispersion at a wavelength of 1.55 μm is 5.7 ps/nm/km, and the dispersion at a wavelength of 1.60 μm is 8.7 ps/nm/km. Further, the bending loss at a wavelength of 1.55 μm when wound at a diameter of 32 mm is 0.00006 dB per turn, whereas the effective area $A_{eff}$ at the wavelength of 1.55 μm is 45.3 μm².

Sixteenth Embodiment

The sixteenth embodiment of the optical fiber according to the present invention has a refractive index profile similar to that of the fifth embodiment shown in FIG. 6, but differs therefrom in that the refractive index ($n_2$) of the second core is set higher than the refractive index ($n_4$) of the cladding region and in that the form of the refractive index profile of the first core is an α-type distribution (dome form such as one shown in FIG. 5).

As in the above-mentioned fifth embodiment, the optical fiber according to the sixteenth embodiment comprises a first core having a maximum refractive index $n_1$; a second core, provided on the outer periphery of the first core, having a refractive index $n_2$ ($<n_1$); a third core, provided on the outer periphery of the second core, having a refractive index $n_3$ ($>n_2$, $<n_1$); and a cladding region, provided on the outer periphery of the third core, having a refractive index $n_4$ ($<n_3$).

In the optical fiber according to the sixteenth embodiment, the outside diameter $2a$ of the first core is 6.7

μm, the outside diameter 2b of the second core is 13.4 μm, and the outside diameter 2c of the third core is 22.4 μm. With reference to the refractive index $n_4$ of the cladding region, the relative refractive index difference $\Delta_1$ $(=(n_1-n_4)/n_4)$ of the first core is 0.60%, the relative refractive index difference $\Delta_2$ $(=(n_2-n_4)/n_4)$ of the second core is 0.05%, and the relative refractive index difference $\Delta_3$ $(=(n_3-n_4)/n_4)$ of the third core is 0.11%.

The optical fiber according to the sixteenth embodiment has a zero-dispersion wavelength at 1.47 μm, and only this one zero-dispersion wavelength exists within a wavelength range of 1.20 μm to 1.60 μm. The dispersion slope at the zero-dispersion wavelength is 0.065 ps/nm²/km, the dispersion slope at a wavelength of 1.55 μm is 0.065 ps/nm²/km, and the cutoff wavelength is 1.37 μm. Also, the dispersion slope monotonously increases at least in a wavelength range of 1.30 μm to 1.55 μm; and, specifically, the dispersion at a wavelength of 1.20 μm is −21.1 ps/nm/km, the dispersion at a wavelength of 1.30 μm is −12.1 ps/nm/km, the dispersion at a wavelength of 1.45 μm is −1.3 ps/nm/km, the dispersion at a wavelength of 1.55 μm is 5.1 ps/nm/km, and the dispersion at a wavelength of 1.60 μm is 8.4 ps/nm/km. Further, the bending loss at a wavelength of 1.55 μm when wound at a diameter of 32 mm is 0.02 dB per turn, whereas the effective area $A_{eff}$ at the wavelength of 1.55 μm is 62.6 μm².

Seventeenth Embodiment

The seventeenth embodiment of the optical fiber according to the present invention has a refractive index profile similar to that of the third embodiment shown in FIG. 4, while having a cutoff wavelength longer than its signal light wavelength.

As in the above-mentioned third embodiment, the optical fiber according to the seventeenth embodiment comprises a first core having a refractive index $n_1$; a second core, provided on the outer periphery of the first core, having a refractive index $n_2$ ($<n_1$); and a cladding region, provided on the outer periphery of the second core, having a refractive index $n_3$ ($<n_2$).

In the optical fiber according to the seventeenth embodiment, the outside diameter 2a of the first core is 7.5 μm, whereas the outside diameter 2b of the second core is 29.0 μm. With reference to the refractive index $n_3$ of the cladding region, the relative refractive index difference $\Delta_1$ $(=(n_1-n_3)/n_3)$ of the first core is 0.61%, whereas the relative refractive index difference $\Delta_2$ $(=(n_2-n_3)/n_3)$ of the second core is 0.10%.

The optical fiber according to the seventeenth embodiment has a zero-dispersion wavelength at 1.40 μm, and only this one zero-dispersion wavelength exists within a wavelength range of 1.20 μm to 1.60 μm. The dispersion slope at the zero-dispersion wavelength is 0.071 ps/nm²/km, the dispersion slope at a wavelength of 1.55 μm is 0.059 ps/nm²/km, and the cutoff wavelength is 1.78 μm. Also, the dispersion slope monotonously increases at least in a wavelength range of 1.30 μm to 1.55 μm; and, specifically, the dispersion at a wavelength of 1.20 μm is −17.4 ps/nm/km, the dispersion at a wavelength of 1.30 μm is −7.7 ps/nm/km, the dispersion at a wavelength of 1.45 μm is 3.5 ps/nm/km, the dispersion at a wavelength of 1.55 μm is 9.7 ps/nm/km, and the dispersion at a wavelength of 1.60 μm is 12.6 ps/nm/km. Further, the bending loss at a wavelength of 1.55 μm when wound at a diameter of 32 mm is 0.00002 dB per turn, whereas the effective area $A_{eff}$ at the wavelength of 1.55 μm is 60.3 μm².

As for the optical fiber having a triple structure in which the core region is constituted by the first to third cores as shown in FIGS. 6 and 7, a plurality of embodiments having such a low dispersion slope that the dispersion at a wavelength of 1.55 μm is 0.06 ps/nm²/km or less will now be explained.

Eighteenth Embodiment

The eighteenth embodiment of the optical fiber according to the present invention has a refractive index profile similar to that of the fifth embodiment shown in FIG. 6, while having a low dispersion slope.

As in the above-mentioned fifth embodiment, the optical fiber according to the eighteenth embodiment comprises a first core having a refractive index $n_1$; a second core, provided on the outer periphery of the first core, having a refractive index $n_2$ ($<n_1$); a third core, provided on the outer periphery of the second core, having a refractive index $n_3$ ($>n_2$, $<n_1$); and a cladding region, provided on the outer periphery of the third core, having a refractive index $n_4$ ($=n_2$).

In the optical fiber according to the eighteenth embodiment, the outside diameter 2a of the first core is 5.5 μm, the outside diameter 2b of the second core is 22.8 μm, and the outside diameter 2c of the third core is 34.6 μm. With reference to the refractive index $n_4$ of the cladding region, the relative refractive index difference $\Delta_1$ $(=(n_1-n_4)/n_4)$ of the first core is 0.48%, the relative refractive index difference of the second core is 0% since it is set such that $n_2=n_4$, and the relative refractive index difference $\Delta_3$ $(=(n_3-n_4)/n_4)$ of the third core is 0.12%.

The optical fiber according to the eighteenth embodiment has a zero-dispersion wavelength at 1.41 μm, and only this one zero-dispersion wavelength exists within a wavelength range of 1.20 μm to 1.60 μm. The dispersion slope at the zero-dispersion wavelength is 0.058 ps/nm²/km, the dispersion slope at a wavelength of 1.55 μm is 0.040 ps/nm²/km, and the cutoff wavelength is 1.75 μm. Also, the dispersion slope monotonously increases at least in a wavelength range of 1.30 μm to 1.55 μm; and, specifically, the dispersion at a wavelength of 1.20 μm is −16.5 ps/nm/km, the dispersion at a wavelength of 1.30 μm is −7.5 ps/nm/km, the dispersion at a wavelength of 1.45 μm is 2.1 ps/nm/km, the dispersion at a wavelength of 1.55 μm is 6.8 ps/nm/km, and the dispersion at a wavelength of 1.60 μm is 8.6 ps/nm/km. Further, the bending loss at a wavelength of 1.55 μm when wound at a diameter of 32 mm is 0.2 dB per turn, whereas the effective area $A_{eff}$ at the wavelength of 1.55 μm is 57.1 μm².

Nineteenth Embodiment

The nineteenth embodiment of the optical fiber according to the present invention is also an optical fiber having a refractive index profile similar to that of the fifth embodiment shown in FIG. 6, while having a low dispersion slope. The refractive index profile of the nineteenth embodiment differs from that of the fifth embodiment or that of the above-mentioned eighteenth embodiment in that the refractive index ($n_2$) of the second core is set higher than the refractive index ($n_4$) of the cladding region.

As in the above-mentioned fifth embodiment, the optical fiber according to the nineteenth embodiment comprises a first core having a refractive index $n_1$; a second core, provided on the outer periphery of the first core, having a refractive index $n_2$ ($<n_1$); a third core, provided on the outer periphery of the second core, having a refractive index $n_3$ ($>n_2$, $<n_1$); and a cladding region, provided on the outer periphery of the third core, having a refractive index $n_4$ ($<n_3$).

In the optical fiber according to the nineteenth embodiment, the outside diameter 2a of the first core is 6.2 μm, the outside diameter 2b of the second core is 19.9 μm, and the outside diameter 2c of the third core is 28.4 µm. With reference to the refractive index $n_4$ of the cladding region, the relative refractive index difference $\Delta_1$ (=$(n_1-n_4)/n_4$) of the first core is 0.44%, the relative refractive index difference $\Delta_2$ (=$(n_2-n_4)/n_4$) of the second core is 0.01%, and the relative refractive index difference $\Delta_3$ (=$(n_3-n_4)/n_4$) of the third core is 0.13%.

The optical fiber according to the nineteenth embodiment has a zero-dispersion wavelength at 1.38 µm, and only this one zero-dispersion wavelength exists within a wavelength range of 1.20 µm to 1.60 µm. The dispersion slope at the zero-dispersion wavelength is 0.065 ps/nm²/km, the dispersion slope at a wavelength of 1.55 µm is 0.047 ps/nm²/km, and the cutoff wavelength is 1.52 µm. Also, the dispersion slope monotonously increases at least in a wavelength range of 1.30 µm to 1.55 µm; and, specifically, the dispersion at a wavelength of 1.20 µm is −14.5 ps/nm/km, the dispersion at a wavelength of 1.30 µm is −5.4 ps/nm/km, the dispersion at a wavelength of 1.45 µm is 4.4 ps/nm/km, the dispersion at a wavelength of 1.355 µm is 9.4 ps/nm/km, and the dispersion at a wavelength of 1.60 µm is 11.7 ps/nm/km. Further, the bending loss at a wavelength of 1.55 µm when wound at a diameter of 32 mm is 0.07 dB per turn, whereas the effective area $A_{eff}$ at the wavelength of 1.55 µm is 64.5 µm².

Twentieth Embodiment

As with the sixth embodiment shown in FIG. 7, the twentieth embodiment of the optical fiber according to the present invention is an optical fiber having a refractive index profile of a depressed cladding structure, while having a low dispersion slope. In the refractive index profile of the twentieth embodiment, as in the above-mentioned nineteenth embodiment, the refractive index ($n_2$) of the second core is set higher than the refractive index ($n_4$) of the cladding region.

In the optical fiber according to the twentieth embodiment, as in the above-mentioned sixth embodiment, the core region comprises a first core having a refractive index $n_1$; a second core, provided on the outer periphery of the first core, having a refractive index $n_2$ (<$n_1$); and a third core, provided on the outer periphery of the second core, having a refractive index $n_3$ (>$n_2$, <$n_1$). Also, the cladding region comprises an inner cladding, provided on the outer periphery of the third core, having a refractive index $n_5$ (<$n_3$); and an outer cladding, provided on the outer periphery of the inner cladding, having a refractive index $n_4$ (<$n_3$, >$n_5$); whereas the inner and outer claddings constitute the depressed cladding structure.

In the optical fiber according to the twentieth embodiment, the outside diameter 2a of the first core is 5.6 µm, the outside diameter 2b of the second core is 19.7 µm, the outside diameter 2c of the third core is 28.1 µm, and the outside diameter 2d of the inner cladding is 42.0 µm. With reference to the refractive index $n_4$ of the outer cladding, the relative refractive index difference $\Delta_1$ (=$(n_1-n_4)/n_4$) of the first core is 0.55%, the relative refractive index difference $\Delta_2$ (=$(n_2-n_4)/n_4$) of the second core is 0.01%, the relative refractive index difference $\Delta_3$ (=$(n_3-n_4)/n_4$) of the third core is 0.16%, and the relative refractive index difference $\Delta_5$ (=$(n_5-n_4)/n_4$) of the inner cladding is −0.05%.

The optical fiber according to the twentieth embodiment has a zero-dispersion wavelength at 1.40 µm, and only this one zero-dispersion wavelength exists within a wavelength range of 1.20 µm to 1.60 µm. The dispersion slope at the zero-dispersion wavelength is 0.059 ps/nm²/km, the dispersion slope at a wavelength of 1.55 µm is 0.043 ps/nm²/km, and the cutoff wavelength is 1.59 µm. Also, the dispersion slope monotonously increases at least in a wavelength range of 1.30 µm to 1.55 µm; and, specifically, the dispersion at a wavelength of 1.20 µm is −15.8 ps/nm/km, the dispersion at a wavelength of 1.30 µm is −6.9 ps/nm/km, the dispersion at a wavelength of 1.45 µm is 2.7 ps/nm/km, the dispersion at a wavelength of 1.55 µm is 7.4 ps/nm/km, and the dispersion at a wavelength of 1.60 µm is 9.5 ps/nm/km. Further, the bending loss at a wavelength of 1.55 µm when wound at a diameter of 32 mm is 0.001 dB per turn, whereas the effective area $A_{eff}$ at the wavelength of 1.55 µm is 50.4 µm².

Twenty-first Embodiment

The twenty-first embodiment of the optical fiber according to the present invention is an optical fiber having a refractive index profile similar to that of the above-mentioned fifth embodiment shown in FIG. 6, while having a low dispersion slope.

As in the above-mentioned fifth embodiment, the optical fiber according to the twenty-first embodiment comprises a first core having a refractive index $n_1$; a second core, provided on the outer periphery of the first core, having a refractive index $n_2$ (<$n_1$); a third core, provided on the outer periphery of the second core, having a refractive index $n_3$ (>$n_2$, <$n_1$); and a cladding region, provided on the outer periphery of the third core, having a refractive index $n_4$ (=$n_2$).

In the optical fiber according to the twenty-first embodiment, the outside diameter 2a of the first core is 6.1 µm, the outside diameter 2b of the second core is 17.8 µm, and the outside diameter 2c of the third core is 25.4 µm. With reference to the refractive index $n_4$ of the cladding region, the relative refractive index difference $\Delta_1$ (=$(n_1-n_4)/n_4$) of the first core is 0.45%, the relative refractive index difference of the second core is 0% since it is set such that $n_2 = n_4$, and the relative refractive index difference $\Delta_3$ (=$(n_3-n_4)/n_4$) of the third core is 0.14%.

The optical fiber according to the twenty-first embodiment has a zero-dispersion wavelength at 1.40 µm, and only this one zero-dispersion wavelength exists within a wavelength range of 1.20 µm to 1.60 µm. The dispersion slope at the zero-dispersion wavelength is 0.057 ps/nm²/km, the dispersion slope at a wavelength of 1.55 µm is 0.046 ps/nm²/km, and the cutoff wavelength is 1.44 µm. Also, the dispersion slope monotonously increases at least in a wavelength range of 1.30 µm to 1.55 µm; and, specifically, the dispersion at a wavelength of 1.20 µm is −15.2 ps/nm/km, the dispersion at a wavelength of 1.30 µm is −6.5 ps/nm/km, the dispersion at a wavelength of 1.45 µm is 2.7 ps/nm/km, the dispersion at a wavelength of 1.55 µm is 7.5 ps/nm/km, and the dispersion at a wavelength of 1.60 µm is 9.8 ps/nm/km. Further, the bending loss at a wavelength of 1.55 µm when wound at a diameter of 32 mm is 0.1 dB per turn, whereas the effective area $A_{eff}$ at the wavelength of 1.55 µm is 64.4 µm².

Twenty-second Embodiment

As in the sixth embodiment shown in FIG. 7, the twenty-second embodiment of the optical fiber according to the present invention has a refractive index profile of a depressed cladding structure, while having a low dispersion slope. In the refractive index profile of the twenty-second embodiment, contrary to the above-mentioned twentieth embodiment, the refractive index ($n_2$) of the second core is set lower than the refractive index ($n_4$) of the cladding region.

In the optical fiber according to the twenty-second embodiment, as in the above-mentioned sixth embodiment, the core region comprises a first core having a refractive index $n_1$; a second core, provided on the outer periphery of the first core, having a refractive index $n_2$ (<$n_1$); and a third core, provided on the outer periphery of the second core, having a refractive index $n_3$ (>$n_2$, <$n_1$). Also, the cladding region comprises an inner cladding, provided on the outer periphery of the third core, having a refractive index $n_5$ (<$n_3$); and an outer cladding, provided on the outer periphery of the inner cladding, having a refractive index $n_4$ (<$n_3$, >$n_5$); whereas the inner and outer claddings constitute the depressed cladding structure.

In the optical fiber according to the twenty-second embodiment, the outside diameter $2a$ of the first core is 6.0 µm, the outside diameter $2b$ of the second core is 19.7 µm, the outside diameter $2c$ of the third core is 30.0 µm, and the outside diameter $2d$ of the inner cladding is 44.8 µm. With reference to the refractive index $n_4$ of the outer cladding, the relative refractive index difference $\Delta_1$ (=($n_1-n_4$)/$n_4$) of the first core is 0.46%, the relative refractive index difference $\Delta_2$ (=($n_2-n_4$)/$n_4$) of the second core is −0.05%, the relative refractive index difference $\Delta_3$ (=($n_3-n_4$)/$n_4$) of the third core is 0.16%, and the relative refractive index difference $\Delta_5$ (=($n_5-n_4$)/$n_4$) of the inner cladding is −0.05%.

The optical fiber according to the twenty-second embodiment has a zero-dispersion wavelength at 1.39 µm, and only this one zero-dispersion wavelength exists within a wavelength range of 1.20 µm to 1.60 µm. The dispersion slope at the zero-dispersion wavelength is 0.052 ps/nm$^2$/km, the dispersion slope at a wavelength of 1.55 µm is 0.023 ps/nm$^2$/km, and the cutoff wavelength is 1.66 µm. Also, the dispersion slope monotonously increases at least in a wavelength range of 1.30 µm to 1.55 µm; and, specifically, the dispersion at a wavelength of 1.20 µm is −14.4 ps/nm/km, the dispersion at a wavelength of 1.30 µm is −5.7 ps/nm/km, the dispersion at a wavelength of 1.45 µm is 2.8 ps/nm/km, the dispersion at a wavelength of 1.55 µm is 5.9 ps/nm/km, and the dispersion at a wavelength of 1.60 µm is 7.0 ps/nm/km. Further, the bending loss at a wavelength of 1.55 µm when wound at a diameter of 32 mm is 0.3 dB per turn, whereas the effective area $A_{eff}$ at the wavelength of 1.55 µm is 55.6 $\mu^2$.

FIG. 11 is a table listing various characteristics of respective optical fibers according to the above-mentioned first to thirteenth embodiments. Also, FIG. 12 is a table listing various characteristics of respective optical fibers according to the above-mentioned fourteenth to twenty-second embodiments. As shown in these tables, each of the optical fibers according to the first to twenty-second embodiments has only one zero-dispersion wavelength within a wavelength range of 1.20 µm to 1.60 µm, whereas this zero-dispersion wavelength lies within a wavelength range of 1.37 µm to 1.50 µm. In particular, the zero-dispersion wavelength lies within a wavelength range of 1.37 µm to 1.43 µm in the third, fourth, sixth to ninth, eleventh to fourteenth, and seventeenth to twenty-second embodiments, whereas it lies within a wavelength range of longer than 1.45 µm but not longer than 1.55 µm in the second, fifth, fifteenth, and sixteenth embodiments. In each of the embodiments, the absolute value of dispersion slope at the zero-dispersion wavelength is 0.10 ps/nm$^2$/km or less, whereas the cutoff wavelength is 1.3 µm or shorter. Therefore, each of these optical fibers is of a single mode having no zero-dispersion wavelength at the 1.3-µm wavelength band nor 1.5-µm wavelength band, while the dispersion at each of these wavelength bands is kept low, thereby being suitable for optical communications utilizing a plurality of wavelength bands. At a wavelength of 1.55 µm, the first, second, sixth, thirteenth to fifteenth, and eighteenth to twenty-second embodiments have a dispersion slope of 0.06 ps/nm$^2$/km, with the eighteenth to twenty-second embodiments having a further lower dispersion slope in particular.

Also, in each of the optical fibers according to the first to twenty-second embodiments, the dispersion slope monotonously changes in a wavelength range of 1.30 µm to 1.55 µm, whereas the absolution value of dispersion at wavelengths of 1.3 µm and 1.55 µm is 12 ps/nm/km or less. Therefore, the absolute value of dispersion in the 1.3-µm wavelength band and 1.55-µm wavelength band in each of these optical fibers is sufficiently smaller than the dispersion value (about 17 ps/nm/km) in the 1.55-µm wavelength band of a conventional standard single-mode optical fiber having a zero-dispersion wavelength in the 1.3-µm wavelength band. If the dispersion value up to that (about 17 ps/nm/km) in the 1.55-µm wavelength band of the above-mentioned standard single-mode optical fiber is permissible in an optical transmission system as a whole, then each of the respective optical fibers according to the first to twenty-second embodiments is suitably utilized in optical communications having a signal light wavelength band within a range of 1.2 µm to 1.7 µm.

Further, each of the optical fibers according to the first to twenty-second embodiments has a bending loss of 0.5 dB or less per turn at a wavelength of 1.55 µm when wound at a diameter of 32 mm, with this bending loss being 0.06 dB or less in the first to sixth, eleventh, thirteenth to seventeenth, nineteenth, and twentieth embodiments in particular, and thus is preferable in that it can effectively suppress the increase in loss caused by cabling and the like. Also, each of the optical fibers according to the first to twenty-second embodiments has an effective area $A_{eff}$ of 45 µm$^2$ or more at a wavelength of 1.55 µm, with the effective area $A_{eff}$ in the first, third to fourteenth, and sixteenth to twenty-second embodiments exceeding 49 µm$^2$ in particular, which is on a par with or greater than the effective area of conventional dispersion-shifted optical fibers. Hence, the light propagating through the optical fiber has a lower intensity per unit cross-sectional area, whereby nonlinear optical phenomena such as four-wave mixing can effectively be suppressed.

In the refractive index profiles 150 to 950 shown in FIGS. 2B, and 3 to 10, the maximum and minimum values of relative refractive index difference with reference to the refractive index of the reference region (the cladding region 120, or the outer cladding if the cladding region 120 has a depressed cladding structure) of pure silica (silica which is not intentionally doped with impurities) is 1% or less and −0.5% or more, respectively, except for the above-mentioned thirteenth embodiment. Though the thirteenth embodiment comprises a structure in which the cladding region 120 is doped with fluorine so as to relatively enhance the difference in refractive index between the core region made of pure silica and the cladding region, the maximum value of relative refractive index difference of the core region 110 with respect to the cladding region 120 is 1% or less even in this embodiment. While a high refractive index region is realized by doping with Ge element, for example; since its relative refractive index difference is 1% or less, the making of this optical fiber (refractive index control by doping with impurities) is relatively easy, and its transmission loss becomes smaller. While a low refractive index region, on the other hand, is realized by doping with F element, for example; since its relative refractive index difference is −0.5% or more, the making of this optical fiber is easy in this regard as well.

Figure 13:
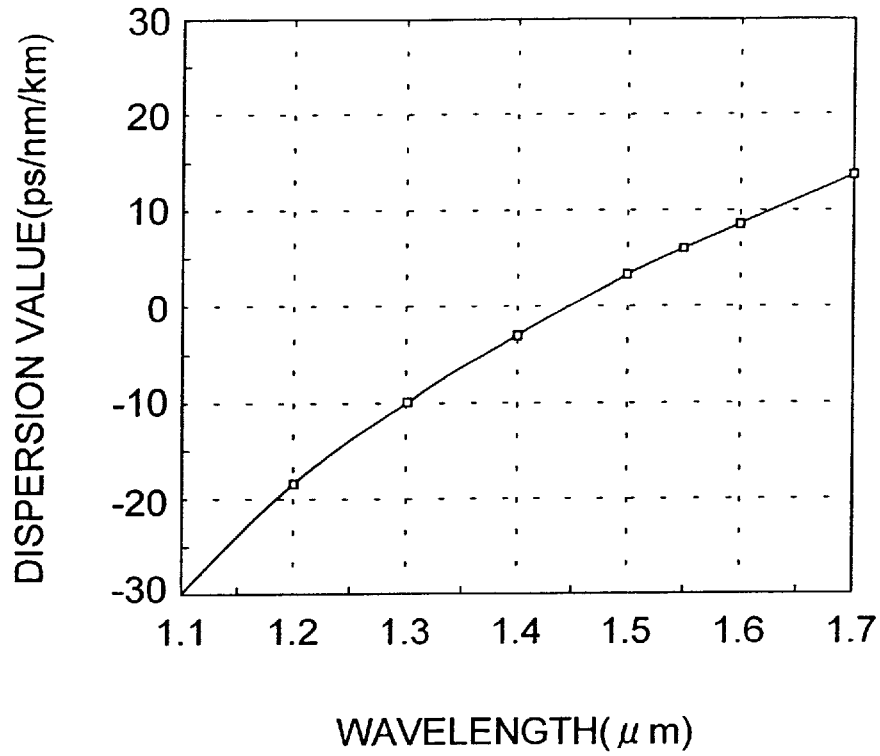
FIG. 13 is a graph showing a dispersion characteristic of the optical fiber according to the first embodiment with respect to wavelength.
Figure 14:
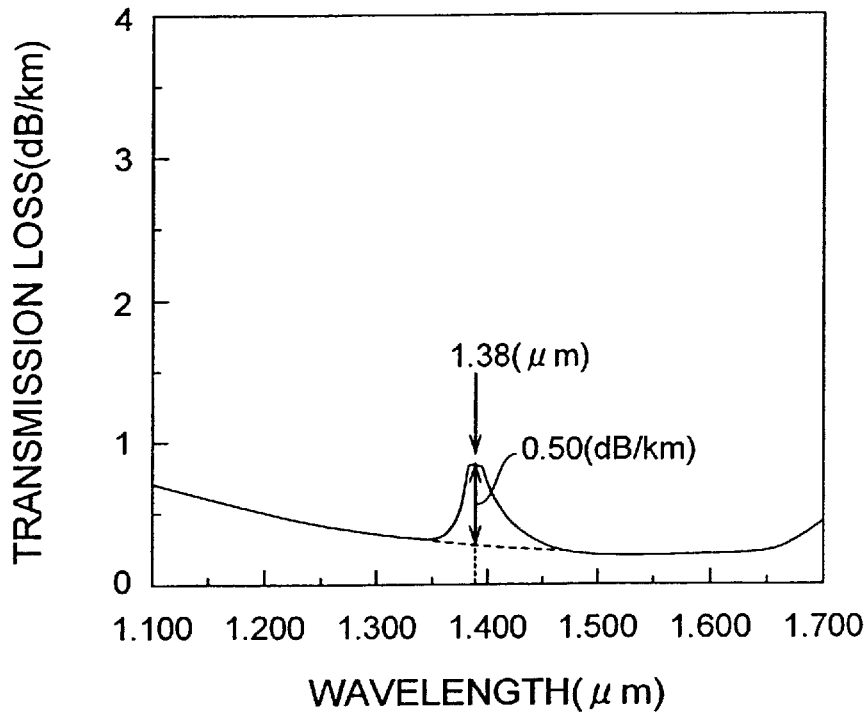
FIG. 14 is a graph showing a transmission loss characteristic with respect to wavelength of an optical fiber according to the first embodiment in which dehydration processing has been insufficient.
Figure 15:
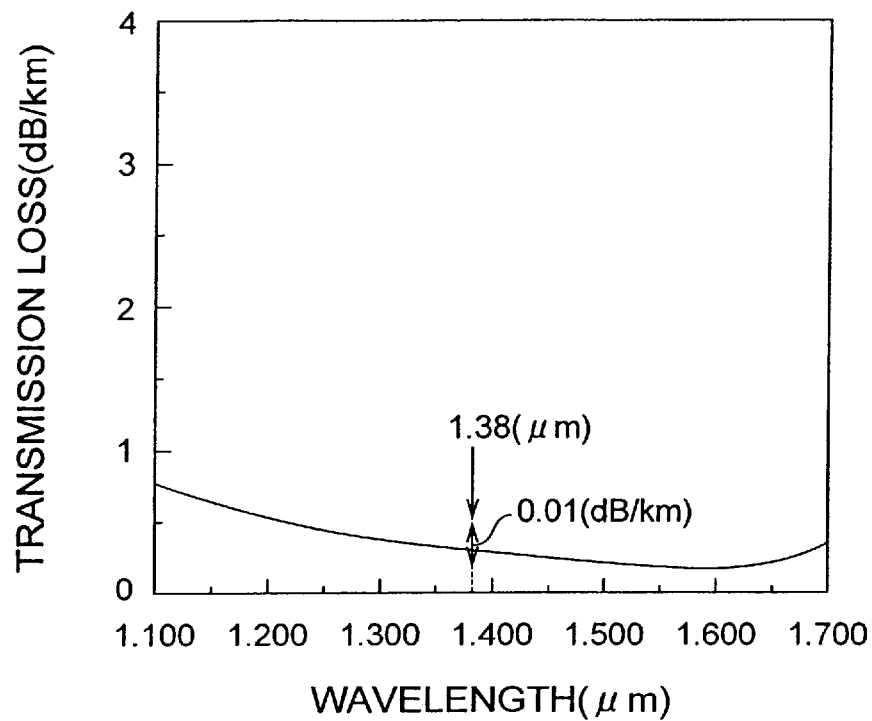
FIG. 15 is a graph showing a transmission loss characteristic with respect to wavelength of optical fibers according to the first and thirteenth embodiments in which dehydration processing has been carried out sufficiently.

FIG. 13 is a graph showing a dispersion characteristic of the optical fiber according to the first embodiment with respect to wavelength. As shown in this graph, the dispersion slope monotonously increases in a wavelength range of 1.30 µm to 1.55 µm. Also, FIGS. 14 and 15 are graphs showing transmission loss characteristics with respect to wavelength of the optical fiber according to the first embodiment in cases where dehydration processing is insufficient and sufficient, respectively. As shown in these graphs, an increase in transmission loss caused by OH absorption is seen at a wavelength of 1.38 μm. In an optical fiber having such a transmission loss characteristic as that shown in FIG. 14, the dehydration processing is not sufficiently effected, so that the OH group content is large, whereby the amount of increase in transmission loss caused by OH absorption is about 0.5 dB/km. An optical fiber having such a transmission loss characteristics as that shown in FIG. 15, on the other hand, the dehydration processing is sufficiently effected so as to reduce the OH group content, whereby the increase in transmission loss caused by OH absorption is suppressed to about 0.01 dB/km. When the above-mentioned wavelength band is utilized as a signal wavelength band, the zero-dispersion wavelength can be set within a range of longer than 1.45 μm but not longer than 1.55 μm. The same holds true for the respective dispersion characteristics and transmission characteristics with respect to wavelength of the optical fibers according to the second to twelfth and fourteenth to twenty-second embodiments.

Figure 16:
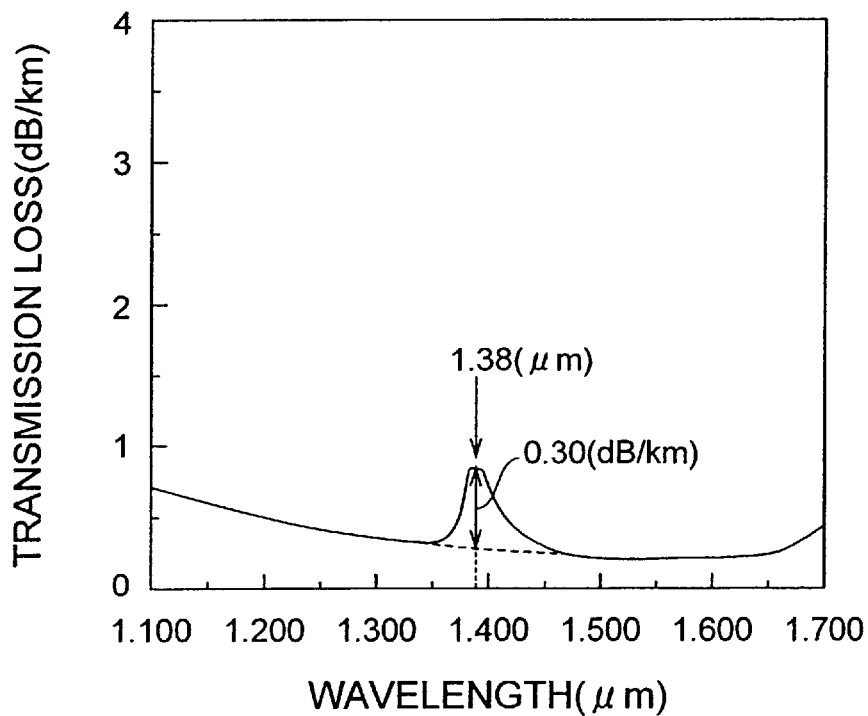
FIG. 16 is a graph showing a transmission loss characteristic with respect to wavelength of an optical fiber according to the thirteenth embodiment in which dehydration processing has been insufficient.

Also, FIG. 16 is a graph showing a transmission loss characteristic with respect to wavelength of the optical fiber according to the thirteenth embodiment in the case where the dehydration processing is insufficient. In the thirteenth embodiment, the increase in transmission loss caused by OH absorption (at a wavelength of 1.38 μm) is 0.3 dB/km when the dehydration processing is not sufficiently effected. If the dehydration processing is sufficiently effected, however, then the increase in transmission loss at a wavelength of 1.3 μm (at a wavelength of 1.38 μm) can be suppressed to 0.01 dB/km or less, as shown in FIG. 14, also in the case of the thirteenth embodiment.

Without being restricted to the above-mentioned individual embodiments, the optical fiber according to the present invention can be modified in various manners; and, for example, other designs are possible within the scope of the present invention.

Figure 17A:
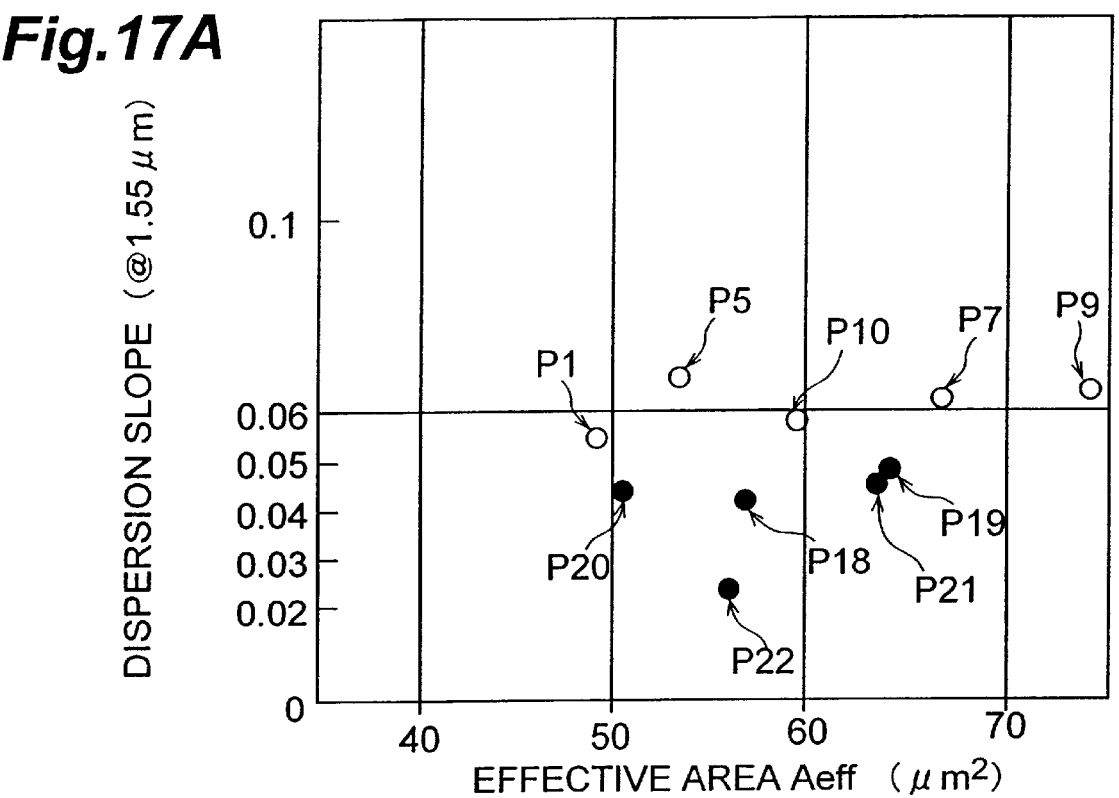

FIG. 17A is a graph showing relationships between effective area $A_{eff}$ and dispersion slope at a wavelength of 1.55 μm mainly concerning the eighteenth to twenty-second embodiments. In this graph, P1, P5, P7, P9, P10, and P18 to P22 are points indicating the relationships between effective area $A_{eff}$ and dispersion slope in the first, fifth, seventh, ninth, tenth, and eighteenth to twenty-second embodiments, respectively.

As can also be seen from this graph, the dispersion slope at a wavelength of 1.55 μm can particularly be lowered in the case of optical fibers (eighteenth to twenty-second embodiments) having such a refractive index profile as that shown in FIG. 6. Also, the effective area $A_{eff}$ at a wavelength of 1.55 μm in the optical fibers according to the eighteenth to twenty-second embodiments is greater than 49 μm².

Figure 17B:
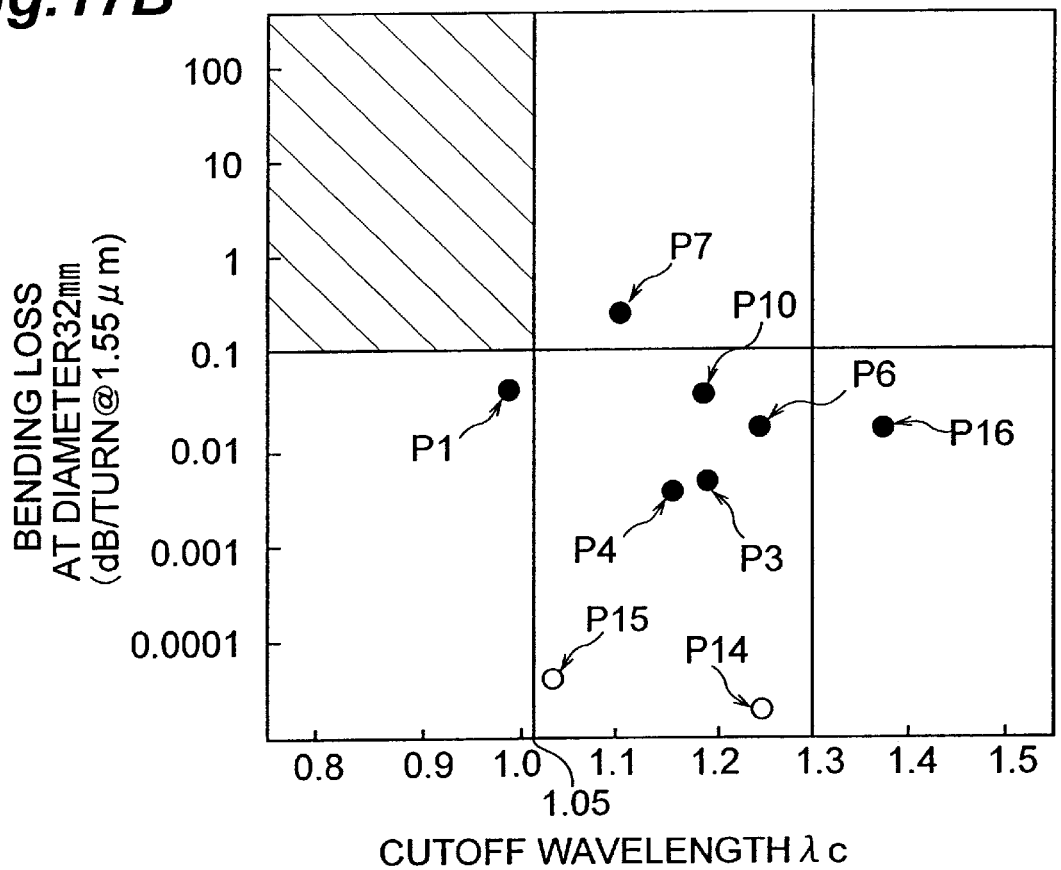
FIG. 17B is a graph showing relationships between cutoff wavelength λc and bending loss per turn when bent at a diameter of 32 mm at a wavelength of 1.55 μm concerning main embodiments.

Further, FIG. 17B is a graph showing relationships between cutoff wavelength λc and bending loss per turn when bent at a diameter of 32 mm at a wavelength of 1.55 μm concerning main embodiments. In this graph, P1, P3, P4, P6, P7, P10, and P14 to P16 show the relationships between cutoff wavelength λc and bending loss in the first, third, fourth, sixth, seventh, tenth, and fourteenth to sixteenth embodiments, respectively. Also, the hatched portion in this graph is an area in which points indicating relationships between cutoff wavelength λc and bending loss are intensively plotted with regard to conventional optical fibers having a refractive index profile similar to that shown in FIG. 6. Therefore, for avoiding this area (hatched portion), i.e., for yielding a bending loss of 1.0 dB/turn or less, preferably 0.06 dB/turn or less at 32 mm at a wavelength of 1.55 μm, it is preferred that the cutoff wavelength λc be 1.05 μm or more, more preferably 1.3 μm or more.

Figure 18A:
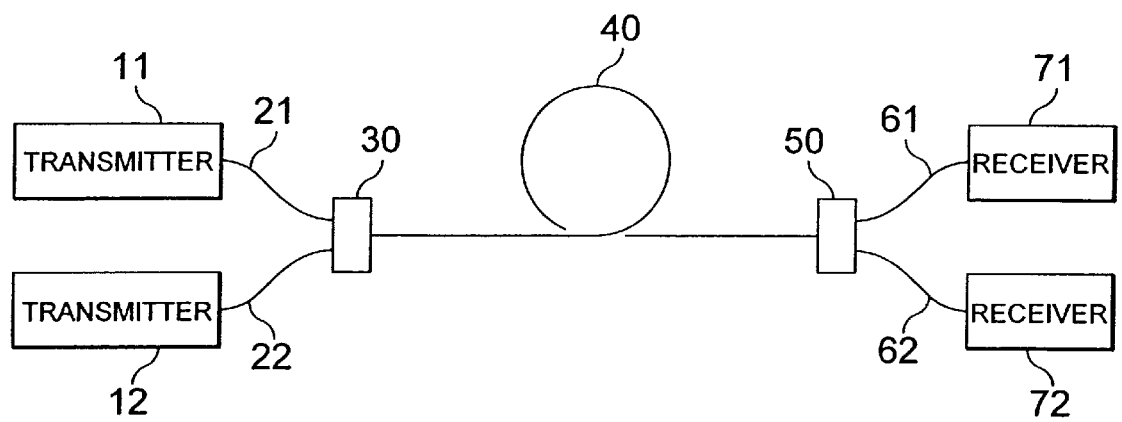

Embodiments of the optical transmission system according to the present invention will now be explained. FIG. 18A is a view showing a schematic configuration of an embodiment of the optical transmission system according to the present invention. The optical transmission system shown in this drawing comprises transmitters 11, 12; optical transmission lines 21, 22; a multiplexer 30; an optical fiber 40; a demultiplexer 50; optical transmission lines 61, 62; and receivers 71, 72.

The transmitter 11 outputs signal light (first signal light) in the 1.3-μm wavelength band; whereas the optical transmission line 21 is a transmission medium for guiding the signal light in the 1.3-μm wavelength band outputted from the transmitter 11 to the multiplexer 30 and, for example, is a standard single-mode optical fiber having a zero-dispersion wavelength in the 1.3-μm wavelength band. The transmitter 12 outputs signal light (second signal light) in the 1.55-μm wavelength band; whereas the optical transmission line 22 is a transmission medium for guiding the signal light in the 1.55-μm wavelength band outputted from the transmitter 12 to the multiplexer 30 and, for example, is a dispersion-shifted optical fiber having a zero-dispersion wavelength in the 1.55-μm wavelength band.

The multiplexer 30 multiplexes the signal light in the 1.3-μm wavelength band and signal light in the 1.55-μm wavelength band propagated through the optical transmission lines 21, 22, and outputs thus multiplexed light to the optical fiber 40. The optical fiber 40 transmits the signal light in the 1.3-μm wavelength band and signal light in the 1.55-μm wavelength band multiplexed by the multiplexer 30 toward the demultiplexer 50. The demultiplexer 50 demultiplexes the signal light in the 1.3-μm wavelength band and signal light in the 1.55-μm wavelength band propagated through the optical fiber 40.

The above-mentioned optical fiber 40 is an optical fiber according to the present invention having a configuration mentioned above, in which only one zero-dispersion wavelength exists within a wavelength range of 1.20 μm to 1.60 μm, whereas this zero-dispersion wavelength lies within a wavelength range of 1.37 μm to 1.50 μm (preferably within a wavelength range of 1.37 μm to 1.43 μm or within a wavelength range of longer than 1.45 μm but not longer than 1.50 μm). Also, in the optical fiber 40, the absolute value of dispersion slope at the zero-dispersion wavelength is 0.10 ps/nm²/km or less (preferably 0.06 ps/nm²/km or less at a wavelength of 1.55 μm). In a more preferred embodiment, the optical fiber 40 has a dispersion slope monotonously changing in a wavelength range of 1.30 μm to 1.55 μm, whereas each of the absolute values of dispersion at wavelengths of 1.3 μm and 1.55 μm is 12 ps/nm/km or less, the bending loss at a wavelength of 1.55 μm when wound at a diameter of 32 mm is 0.5 dB or less (preferably 0.06 dB or less) per turn, the effective area $A_{eff}$ at the wavelength of 1.55 μm is 45 μm² or more (greater than 49 μm²), or the increase in transmission loss caused by OH absorption at a wavelength of 1.38 μm is 0.1 dB/km or less.

The optical transmission line 61 is a transmission medium for guiding the signal light in the 1.3-μm wavelength band demultiplexed by the demultiplexer 50 to the receiver 71 and, for example, is a standard single-mode optical fiber having a zero-dispersion wavelength in the 1.3-μm wavelength band. The receiver 71 receives the signal light in the 1.3-μm wavelength band propagated through the optical transmission line 61. On the other hand, the optical transmission line 62 is a transmission medium for guiding the signal light in the 1.55-μm wavelength band demultiplexed by the demultiplexer 50 to the receiver 72 and, for example, is a dispersion-shifted optical fiber having a zero-dispersion wavelength in the 1.55-μm wavelength band. The receiver 72 receives the signal light in the 1.55-μm wavelength band propagated through the optical transmission line 62.

In the optical transmission system according to this embodiment, the signal light in the 1.3-μm wavelength band having arrived at the multiplexer 30 by way of the optical transmission line 21 after being outputted from the transmitter 11, and the signal light in the 1.55-μm wavelength band having arrived at the multiplexer 30 by way of the optical transmission line 22 after being outputted from the transmitter 12 are multiplexed by the multiplexer 30, and thus multiplexed light propagates through the optical fiber 40 and reaches the demultiplexer 50. The multiplexed light having arrived at the demultiplexer 50 is demultiplexed thereby into the signal light in the 1.3-μm wavelength band and the signal light in the 1.55-μm wavelength band. The demultiplexed signal light in the 1.3-μm wavelength band reaches the receiver 71 by way of the optical transmission line 61, whereas the signal light in the 1.55-μm wavelength band reaches the receiver 72 by way of the optical transmission line 62.

Thus, the optical fiber 40 used in the optical transmission system of this embodiment comprises a structure which realizes favorable optical communications in both of the 1.3-μm wavelength band and 1.55-μm wavelength band, whereby the optical transmission system employing the optical fiber 40 enables large-capacity communications.

Figure 18B:
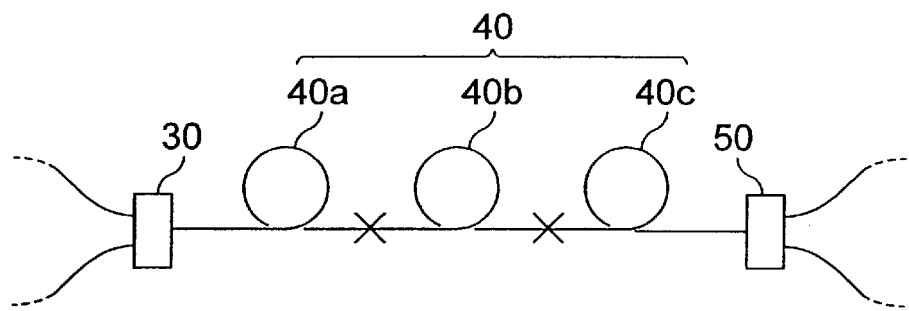
FIG. 18B is a view showing a modified example of the optical transmission system according to the present invention.

Without being restricted to the above-mentioned embodiment, the optical fiber according to the present invention can be modified in various manners. For example, the optical fiber, which is a transmission medium, disposed between the multiplexer 30 and demultiplexer 50 may be constituted by a plurality of optical fibers 40a to 40c as shown in FIG. 18B.

According to the present invention, as explained in the foregoing, the optical fiber has only one zero-dispersion wavelength within a wavelength range of 1.37 μm to 1.50 μm including a wavelength of 1.38 μm at which an increase in transmission loss caused by OH absorption is seen, preferably within a wavelength range of 1.37 μm to 1.43 μm, or within a wavelength range of longer than 1.45 μm but not longer than 1.50 μm, whereas no zero-dispersion wavelength exists in the vicinity of the 1.3-μm wavelength band and 1.55-μm wavelength band sandwiching these wavelength ranges. Therefore, when these wavelength bands are utilized as a signal light wavelength band, dispersion is intentionally generated, so as to effectively suppress nonlinear optical phenomena such as four-wave mixing. Also, since the absolute value of dispersion slope at thus set zero-dispersion wavelength is 0.10 ps/nm$^2$/km or less (preferably 0.06 ps/nm$^2$/km or less at a wavelength of 1.55 μm), the respective dispersions in the 1.3-μm wavelength band and 1.55-μm wavelength band are homogenized. When such an optical fiber is employed in the transmission line of the optical transmission system, favorable optical communications are possible in both of the 1.3-μm wavelength band and 1.55-μm wavelength band.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical fiber, having:
   only one zero-dispersion wavelength within a wavelength range of 1.20 μm to 1.60 μm, said zero-dispersion wavelength existing within a wavelength range of 1.37 μm to 1.50 μm;
   a positive dispersion slope at said zero-dispersion wavelength; and
   an increase in transmission loss, which is caused by OH absorption at a wavelength of 1.38 μm, of 0.1 dB/km or less.

2. An optical fiber according to claim 1, wherein said optical fiber has a bending loss which becomes 0.06 dB/turn or less at a wavelength of 1.55 μm when wound at a diameter of 32 mm.

3. An optical fiber according to claim 1, wherein said optical fiber has a cutoff wavelength of 1.05 μm or more.

4. An optical fiber according to claim 1, wherein said zero-dispersion wavelength exists within a wavelength range of longer than 1.45 μm but not longer than 1.50 μm.

5. An optical transmission system, comprsing:
   a transmitter for transmitting signals of 1.38 μm-wavelength band;
   an optical fiber according to claim 1 through which said signals of 1.38 μm-wavelength band propagate; and
   a receiver for receiving said signals of 1.38 μm-wavelength band from said optical fiber.

6. An optical transmission system according to claim 5, wherein at least one of said signals 1.38 μm-wavelength band has a wavelength of 1.37 μm or more but 1.43 μm or less.

7. An optical transmission system according to claim 5, wherein signals of 1.55 μm-wavelength band propagate through said optical fiber together with said signals of 1.38 μm-wavelength band.

8. An optical transmission system according to claim 7, wherein signals of 1.3 μm-wavelength band propagate through said optical fiber together with said signals of 1.55 μm-wavelength band.

* * * * *